(12) United States Patent
Gunawardena et al.

(10) Patent No.: US 8,707,861 B2
(45) Date of Patent: Apr. 29, 2014

(54) DRY FOOD PASTEURIZATION APPARATUS AND METHOD

(75) Inventors: Ramesh M. Gunawardena, Solon, OH (US); Zhijun Weng, Fresno, CA (US)

(73) Assignee: John Bean Technologies Corporation, Chicago, IL (US)

( * ) Notice: Subject to any disclaimer, the term of this patent is extended or adjusted under 35 U.S.C. 154(b) by 1386 days.

(21) Appl. No.: 11/188,067

(22) Filed: Jul. 22, 2005

(65) Prior Publication Data
US 2006/0040029 A1 Feb. 23, 2006

Related U.S. Application Data

(60) Provisional application No. 60/598,153, filed on Aug. 2, 2004, provisional application No. 60/665,144, filed on Mar. 25, 2005.

(51) Int. Cl.
*A23B 4/03* (2006.01)
*A23B 4/044* (2006.01)
*B60H 3/00* (2006.01)

(52) U.S. Cl.
USPC .......... 99/476; 99/473; 99/483; 426/399; 426/407; 426/510; 426/511; 426/443; 426/455; 426/456; 426/461; 426/465; 422/26; 422/38

(58) Field of Classification Search
CPC ........ A23L 3/185; A23L 3/16; A23B 7/0053; A23B 4/0053
USPC ............. 99/473, 476, 483; 426/399, 407, 426/510–511, 443, 455–456, 461, 465, 426/520–521; 422/26, 38
See application file for complete search history.

(56) References Cited

U.S. PATENT DOCUMENTS

| | | | |
|---|---|---|---|
| 1,625,529 A | | 4/1927 | Forrest |
| 2,086,446 A | * | 7/1937 | Smith, Jr. et al. ............ 131/301 |
| 3,086,837 A | * | 4/1963 | Wilkinson et al. ............ 422/25 |
| 3,548,737 A | | 12/1970 | Evans |
| 3,585,049 A | * | 6/1971 | Galle ............................ 426/521 |

(Continued)

FOREIGN PATENT DOCUMENTS

| | | |
|---|---|---|
| DE | 102 03 190 A1 | 8/2003 |
| GB | 262988 | 12/1926 |
| GB | 2 396 546 A | 6/2004 |
| WO | WO01/37062 * | 5/2001 |

OTHER PUBLICATIONS

MAC, The Humidity Moisture Handbook, 1999, Machine Applications Corporation, http://www.macinstruments.com/pdf/handbook.pdf.*

*Primary Examiner* — Dana Ross
*Assistant Examiner* — Brett Spurlock
(74) *Attorney, Agent, or Firm* — Christensen O'Connor Johnson Kindness PLLC

(57) ABSTRACT

An apparatus for pasteurizing a dry food product comprises an impingement chamber, a conveyor for conveying the dry food product through the impingement chamber; a heater and water supply assembly for generating heated, moist air, and a fan for circulating the heated, moist air through the impingement chamber and onto the dry food product. In operation, the moisture in the heated, moist air condenses on the surface of the dry food product and produces a heat of condensation which heats the surface of the dry food product. Moreover, this heat of condensation is sufficient to kill a percentage of any pathogenic microorganisms which may be present on the surface of the dry food product.

36 Claims, 8 Drawing Sheets

(56) References Cited

U.S. PATENT DOCUMENTS

| | | | |
|---|---|---|---|
| 3,814,901 A * | 6/1974 | Morhack | 219/401 |
| 3,880,668 A * | 4/1975 | Miller | 127/9 |
| 3,897,210 A * | 7/1975 | Gruber et al. | 422/31 |
| 3,937,847 A * | 2/1976 | Elkins et al. | 426/231 |
| 4,003,124 A * | 1/1977 | Connick | 29/460 |
| 4,062,982 A * | 12/1977 | McMillan et al. | 426/320 |
| 4,066,399 A * | 1/1978 | Gunther | 422/27 |
| 4,468,135 A * | 8/1984 | McCain et al. | 374/44 |
| 4,471,790 A * | 9/1984 | Davis et al. | 131/301 |
| 4,701,340 A | 10/1987 | Bratton et al. | |
| 4,834,063 A * | 5/1989 | Hwang et al. | 126/21 A |
| 4,940,040 A | 7/1990 | Randall et al. | |
| 4,994,294 A * | 2/1991 | Gould | 426/519 |
| 5,189,948 A * | 3/1993 | Liebermann | 99/443 C |
| 5,221,357 A * | 6/1993 | Brink | 127/43 |
| 5,309,827 A * | 5/1994 | Manser et al. | 99/468 |
| 5,330,755 A * | 7/1994 | Thomas | 424/757 |
| 5,344,609 A * | 9/1994 | Long | 422/26 |
| 5,411,704 A * | 5/1995 | Schellhaas et al. | 422/29 |
| 5,439,655 A * | 8/1995 | Fedegari | 422/297 |
| 5,474,789 A * | 12/1995 | Hayami et al. | 426/335 |
| 5,525,295 A * | 6/1996 | Pflug et al. | 422/27 |
| 5,609,095 A | 3/1997 | Lemke et al. | |
| 5,711,981 A | 1/1998 | Wilson et al. | |
| 5,741,536 A * | 4/1998 | Mauer et al. | 426/520 |
| 5,772,958 A * | 6/1998 | Nielsen | 422/1 |
| 5,826,496 A | 10/1998 | Jara | |
| 5,840,248 A * | 11/1998 | Ongaro | 422/26 |
| 5,858,435 A * | 1/1999 | Gallo | 426/320 |
| 5,960,703 A * | 10/1999 | Jara et al. | 99/331 |
| 5,976,005 A * | 11/1999 | Wilson et al. | 452/173 |
| 6,019,033 A * | 2/2000 | Wilson et al. | 99/470 |
| 6,086,833 A * | 7/2000 | Conners et al. | 422/292 |
| 6,120,822 A * | 9/2000 | Denvir et al. | 426/320 |
| 6,132,784 A * | 10/2000 | Brandt et al. | 426/248 |
| 6,142,065 A | 11/2000 | Panella et al. | |
| 6,171,561 B1 * | 1/2001 | Williamson et al. | 422/307 |
| 6,195,908 B1 * | 3/2001 | Crul | 34/343 |
| 6,247,395 B1 * | 6/2001 | Yamamoto | 99/451 |
| 6,265,695 B1 * | 7/2001 | Liebermann | 219/385 |
| 6,291,003 B1 | 9/2001 | Riemann et al. | |
| 6,294,211 B1 * | 9/2001 | Yuan et al. | 426/235 |
| 6,299,837 B1 * | 10/2001 | Paul et al. | 422/26 |
| 6,338,867 B1 * | 1/2002 | Lihotzky-Vaupel | 426/557 |
| 6,350,409 B1 * | 2/2002 | Alness et al. | 422/1 |
| 6,350,482 B2 | 2/2002 | Tottenham et al. | |
| 6,354,196 B1 * | 3/2002 | Malmberg et al. | 99/443 C |
| 6,358,548 B1 * | 3/2002 | Ewald et al. | 426/418 |
| 6,410,066 B1 | 6/2002 | Weng | |
| 6,443,056 B1 * | 9/2002 | Kiefer et al. | 99/475 |
| 6,447,737 B1 * | 9/2002 | Williamson et al. | 422/307 |
| 6,450,086 B1 * | 9/2002 | Martinez Ruiz | 99/355 |
| 6,494,131 B2 * | 12/2002 | van de Vorst et al. | 99/443 C |
| 6,502,409 B1 * | 1/2003 | Gatling et al. | 62/80 |
| 6,516,712 B1 * | 2/2003 | Ratermann et al. | 99/476 |
| 6,517,775 B1 * | 2/2003 | Wang et al. | 422/3 |
| 6,531,093 B1 * | 3/2003 | Kikuchi et al. | 422/28 |
| 6,537,600 B1 * | 3/2003 | Meldrum | 426/102 |
| 6,564,699 B1 * | 5/2003 | Vincente et al. | 99/468 |
| 6,569,476 B2 * | 5/2003 | Lim et al. | 426/46 |
| 6,619,189 B1 * | 9/2003 | Tippmann et al. | 99/330 |
| 6,797,233 B1 * | 9/2004 | De Heus | 422/26 |
| 6,953,499 B2 * | 10/2005 | Kellens et al. | 96/181 |
| 7,014,813 B1 * | 3/2006 | Watling et al. | 422/26 |
| RE40,232 E * | 4/2008 | Zittel et al. | 426/509 |
| 2002/0122850 A1 * | 9/2002 | Kartchner | 426/241 |
| 2004/0074401 A1 * | 4/2004 | McMaster et al. | 99/485 |
| 2004/0092022 A1 * | 5/2004 | Bosch | 436/1 |
| 2008/0131313 A1 * | 6/2008 | Bokelmann et al. | 422/28 |

* cited by examiner

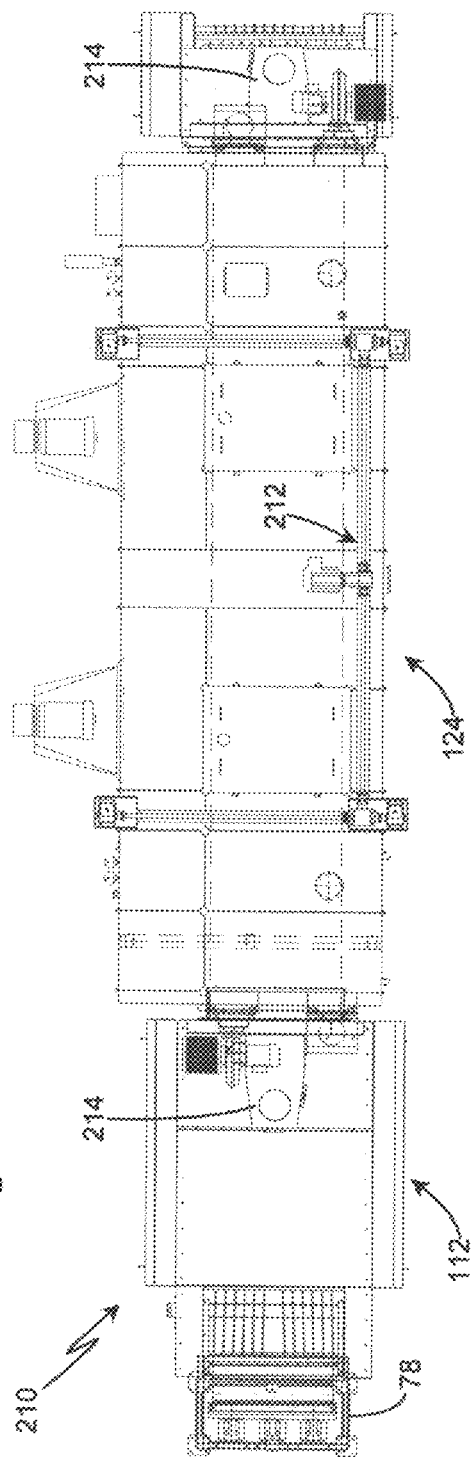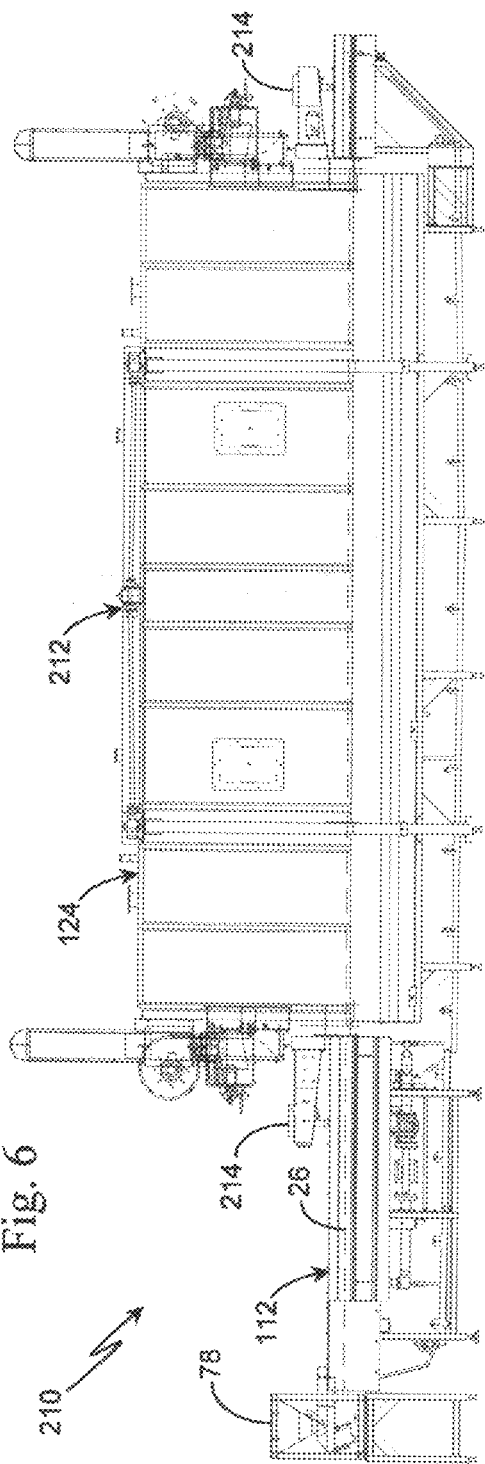

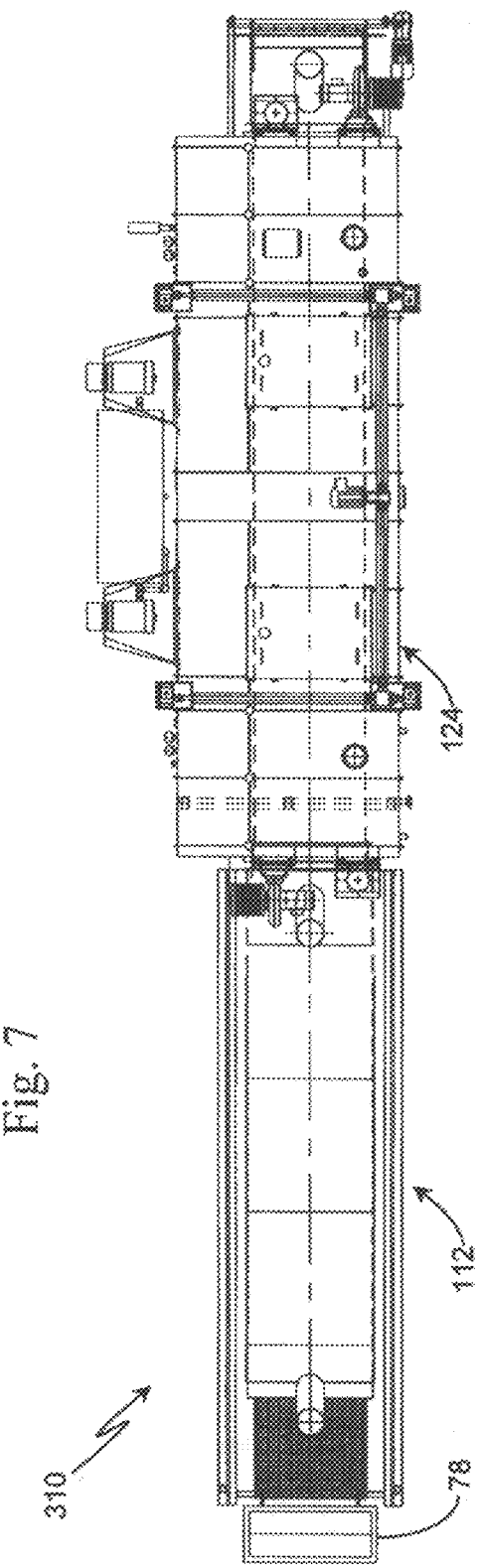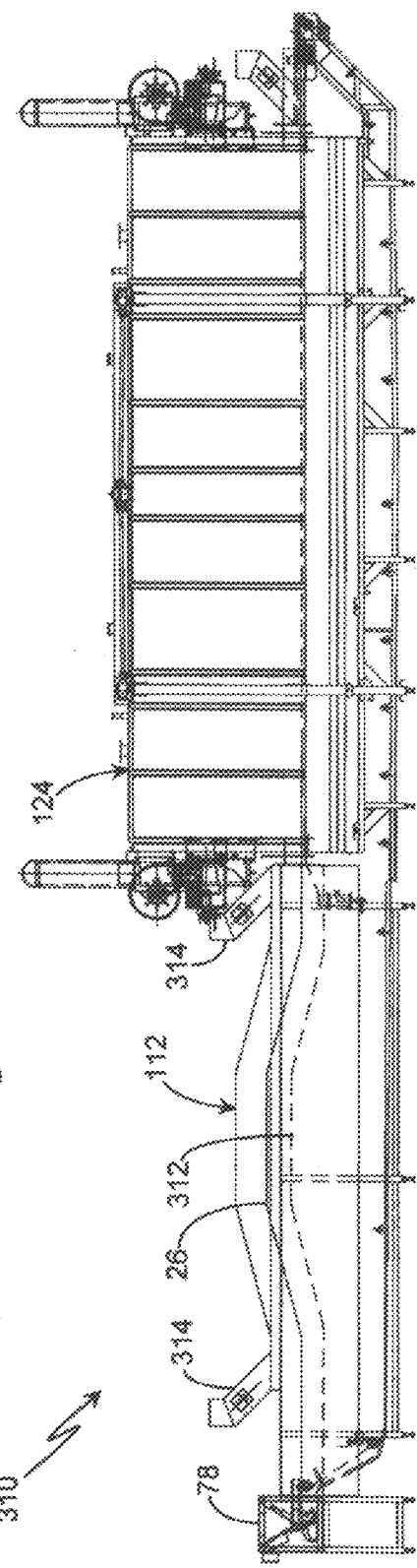

Fig. 10
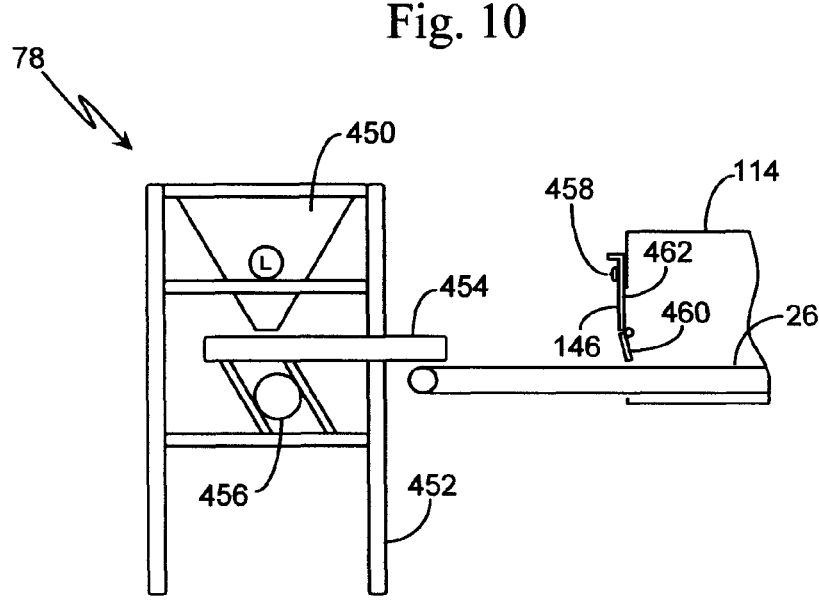
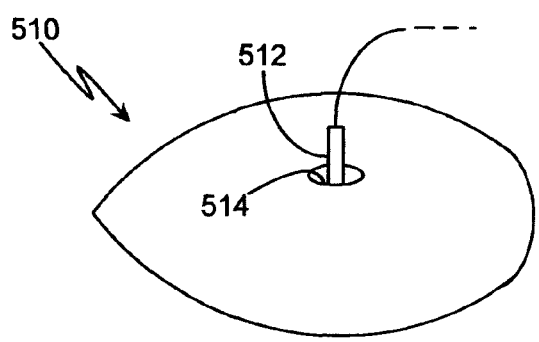
Fig. 12

DRY FOOD PASTEURIZATION APPARATUS AND METHOD

This application is based upon and claims priority from U.S. Provisional Patent Application No. 60/665,144, which was filed on Mar. 25, 2005, and U.S. Provisional Patent Application No. 60/598,153, which was filed on Aug. 2, 2004.

BACKGROUND OF THE INVENTION

The present invention relates to an apparatus and method for pasteurizing dry food products. More particularly, the invention relates to such an apparatus and method which utilizes heated, moist air to both pasteurize and then dry the food products within a single pasteurization chamber or within separate steam and impingement zones of the pasteurization apparatus.

Dry foods comprise one of the largest categories of food commodities in the world. Due to the low water activity of these foods, microbes usually do not grow on their surfaces. However depending on how they are handled, processed, stored and transported, the opportunity does exist for these foods to become contaminated by pathogenic microorganisms such as *Salmonella, E. coli* and *Listeria* through contact with various media such as soil, water and air. As may be readily appreciated, such contamination could pose a serious health problem to consumers.

SUMMARY OF THE INVENTION

In accordance with the present invention, an apparatus for pasteurizing a dry food product is provided which comprises an impingement chamber, means for conveying the dry food product through the impingement chamber, means for generating heated, moist air, and means for circulating the heated, moist air through the impingement chamber and onto the dry food product. In operation, the moisture in the heated, moist air condenses on the surface of the dry food product and produces a heat of condensation which heats the surface of the dry food product. Moreover, this heat of condensation is sufficient to kill a percentage of any pathogenic microorganisms which may be present on the surface of the dry food product.

Thus, the present invention provides a dry food pasteurization apparatus and method which employ heated, moist air to achieve a desired microbial kill rate for the elimination of pathogenic microorganisms on the surface of the dry food product. The apparatus and method can be used to pasteurize a variety of dry food products, including various nuts, dried fruits, dried vegetables, various dried meats, dried herbs, dried seafood and dried seasonings, as well as various semi-dry and wet food products. In addition, the pathogenic microorganisms that are targeted for elimination by the apparatus and method include, but are not limited to, *Salmonella, E-coli* and *Listeria*.

Moreover, the apparatus and method may be self-adjusting based on the input temperature of the dry food product and the targeted strain of the pathogenic microorganism. This self-adjusting feature may provide a more consistent rate of kill regardless of the changes in the input temperature of the dry food product due to, for example, seasonal variations in the ambient temperature at the operating facility.

The pasteurization apparatus and method of the present invention operate to heat the surface of the dry food product primarily through the process of condensation. As the water in the heated, moist air condenses on the surface of the relatively cooler dry food product, the resulting heat of condensation is transmitted to the dry food product. Depending on the dew point temperature of the heated, moist air, this heat of condensation can be sufficient to achieve a desired microbial kill rate not only on the surface, but also at a predetermined depth below the surface of the dry food product.

Furthermore, after the surface temperature of the dry food product reaches the dew point temperature of the surrounding environment, the velocity of the heated, moist air impinging on the dry food product will cause the condensate to evaporate. As a result, the surface of the dry food product will be both dried and slightly cooled. This drying step will help ensure that the product will not mold during its shelf life.

Therefore, the present invention heats the surface of the dry food product to achieve a desired microbial kill rate and then dries the surface after the desired microbial kill rate is achieved. Moreover, both of these steps may take place within the confines of a single pasteurization chamber.

In accordance with another embodiment of the present invention, the apparatus further comprises a steam chamber which is located upstream of the impingement chamber and means for generating steam for the steam chamber. In operation, the steam in the steam chamber condenses on the surface of the dry food product and produces a heat of condensation which heats the surface of the dry food product. Moreover, this heat of condensation is sufficient to kill a percentage of any pathogenic microorganisms present on the surface of the dry food product.

Thus, the pasteurization apparatus of this embodiment of the invention includes successive steam and impingement chambers through which the dry food products are continuously transported by means of, for example, a conventional belt conveyor. In the steam chamber, the surface of the dry food product is rapidly heated through the process of condensation. In the impingement chamber, the heating affect of the condensation process is extended until the surface temperature of the dry food product reaches the dew point temperature, after which point the dry food product is dried and cooled through the process of evaporation.

The impingement chamber may be designed with considerable flexibility to accommodate various airflows, flow distributions, heat penetration rates, temperatures and product dwell times, as may be required for pasteurizing a desired dry food product in an effective and efficient manner. The pasteurization apparatus also includes means, such as an indirect gas-fired heater, for heating the air within the impingement chamber to, for example, above about 212° F., and a water supply assembly for humidifying the heated air. The water supply assembly includes an atomizer which sprays water directly onto the heat exchanger surfaces of the heater to effect the transformation of the water vapor into super-heated steam. The resulting heated, moist air is then thoroughly mixed and circulated by one or more fans through a plenum chamber and into a plurality of upper and lower plenum fingers which are respectively distributed above and below the conveyor belt along the length of the impingement chamber. These plenum fingers include a plurality of slots which emit jets of heated, moist air toward both the top and bottom surfaces of the food product.

The pasteurization apparatus is capable of humidifying the air in the steam and impingement chambers to between about 0% and 95% MV, and optimally to between about 75% and 88% MV. In this regard, the higher humidity levels typically result in greater bacteria kill rates. Therefore, the amount of dry food product which the pasteurization apparatus can process within a given time period may be increased by raising the humidity levels within the steam and impingement chambers.

The pasteurization apparatus may also include a computer to control the pasteurization process. For example, the computer may include a process control program to control the pasteurization process in accordance with predetermined temperature and humidity profiles in order to achieve a desired microbial kill rate within a fixed period of time. The computer may also include a process deviation program which calculates the time and temperature required to achieve a desired kill rate and effects a process correction if, for example, the temperature or humidity of the air in the steam and impingement chambers deviates from its corresponding predetermined profile. In addition, the computer may include a program which models the sub-skin temperature of the dry food product as an aid in determining the required pasteurization time. Also, the computer may be programmed to record the entire pasteurization process for future reference.

Furthermore, the pasteurization apparatus may include one or more suitable temperature, humidity and air velocity sensors for monitoring the temperature, humidity and velocity of the air in at least one of the steam and impingement chambers. These sensors, which are ideally designed to operate at temperatures of up to 500° F., may be connected to the computer to facilitate the control of the pasteurization process by the computer.

The pasteurization apparatus may also be adapted for roasting or drying a given dry food product without requiring changes to the components of the apparatus. In this regard, the desired level of roasting or drying will determine the operating parameters of the apparatus.

Thus, the pasteurization apparatus and method of the present invention provide many advantages over prior art pasteurization systems. In the embodiment in which the pasteurization apparatus includes an indirect gas-fired heater for the impingement chamber, the apparatus achieves superior heat containment due to the absence of products of combustion and consequently a relatively higher energy transfer capability for the transformation of water vapor to steam. In addition, since the pasteurization process takes place at a relatively low temperature, for example between about 212° F. and 400° F., and with relatively short dwell times and the absence of products of combustion in the impingement chamber, minimum changes to the raw flavor and other desired quality attributes of the dry food product occur.

Also, the pasteurization apparatus and method deliver a product which is essentially yield-neutral based on weight; that is, the dry food product experiences negligible weight loss during the pasteurization process. Moreover, the pasteurization process will preserve the surface skin integrity of the dry food product, which might otherwise be affected with the use of steam-only systems. Furthermore, since the pasteurization process involves only a surface treatment of the dry food product, as opposed to cooking, the emissions from the apparatus will be minimal and the apparatus will therefore not require any external pollution control devices. These and other objects and advantages of the present invention will be made apparent from the following detailed description, with reference to the accompanying drawings. In the drawings, the same reference numbers are used to denote certain components which are common to the various embodiments.

BRIEF DESCRIPTION OF THE DRAWINGS

FIG. 5 is a top plan view of a third embodiment of the pasteurization apparatus of the present invention;

FIG. 6 is a front elevation view of the embodiment of the invention shown in FIG. 5;

FIG. 7 is a top plan view of yet another embodiment of the pasteurization apparatus of the present invention;

FIG. 8 is a front elevation view of the embodiment of the invention shown in FIG. 7;

FIG. 10 is a schematic representation of one embodiment of the infeed conveyor portion of the pasteurization apparatus of the present invention;

FIG. 12 is a schematic representation of a temperature measuring device of the present invention.

DETAILED DESCRIPTION OF THE PREFERRED EMBODIMENTS

Figure 1:
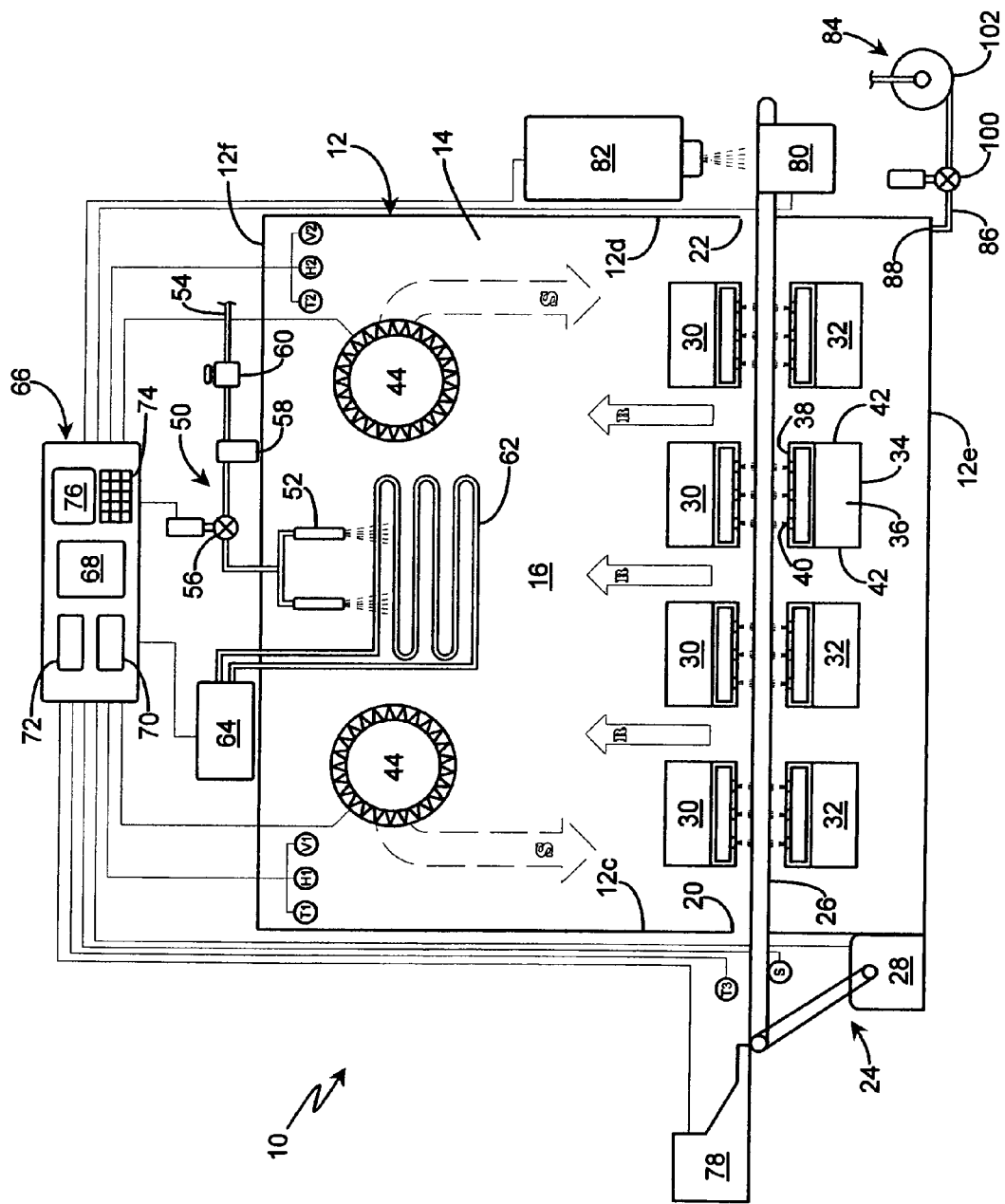
FIG. 1 is a schematic representation of one embodiment of the pasteurization apparatus of the present invention.
Figure 2:
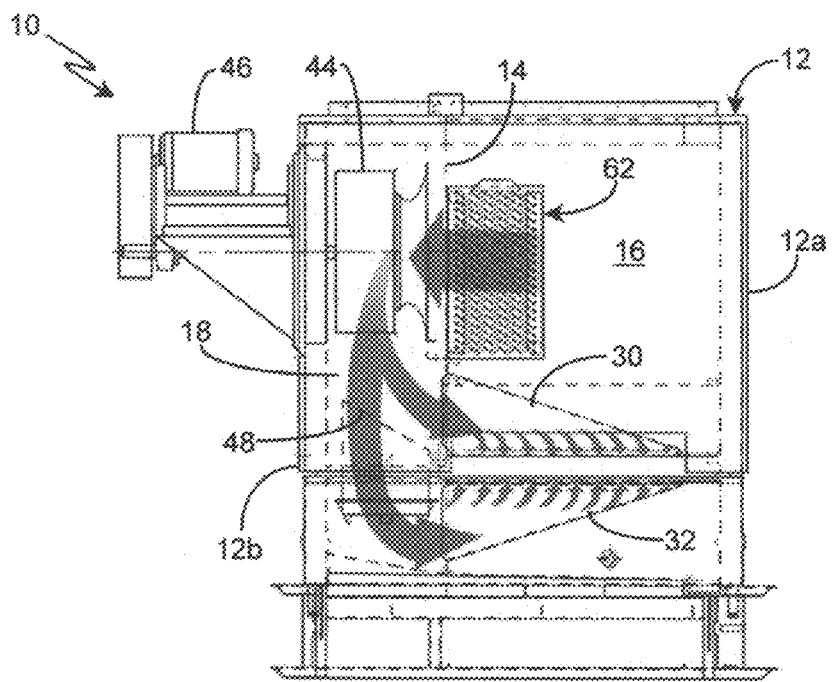
FIG. 2 is a left side elevation view of the embodiment of the invention shown in FIG. 1.
Figure 3:
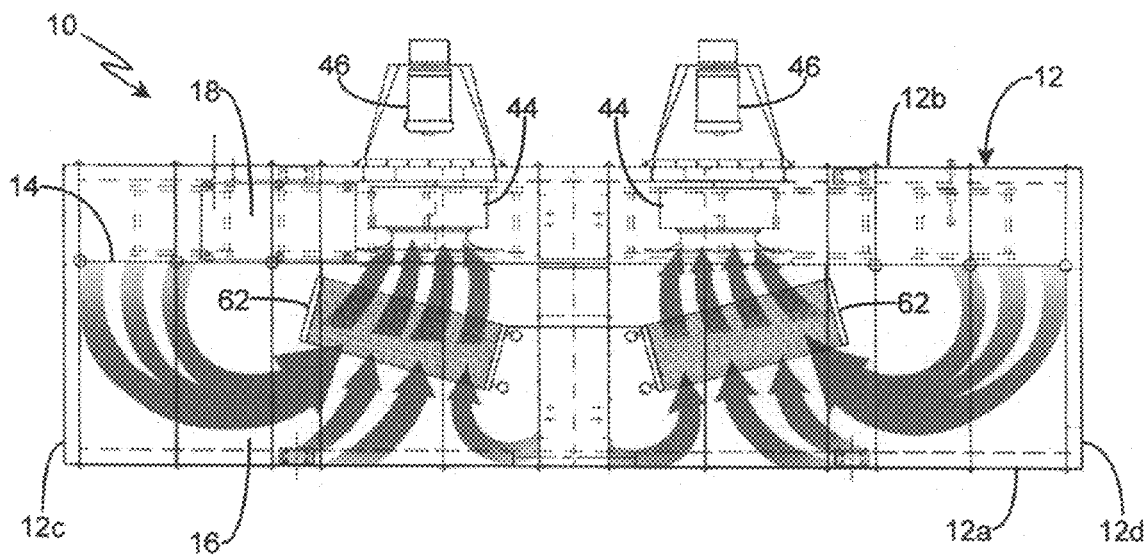
FIG. 3 is a top plan view of the embodiment of the invention shown in FIG. 1.

Referring to FIGS. 1 through 3, the pasteurization apparatus of the present invention, which is indicated generally by reference number 10, includes a housing 12 which comprises front and rear generally parallel side walls 12a, 12b, left and right generally parallel end walls 12c, 12d, a bottom 12e and a top 12f. The housing 12 also comprises a generally vertical partition 14 which extends substantially between the end walls 12c, 12d from the bottom 12e to the top 12f and which consequently divides the interior of the housing into a pasteurization chamber 16 and a plenum chamber 18. The housing 12 further comprises an inlet opening 20 in the left end wall 12c and an outlet opening 22 in the right end wall 12d, both of which communicate with the pasteurization chamber 16.

A suitable conveyor apparatus 24 is provided for transporting the food products through the pasteurization chamber 16. The conveyor apparatus 24 includes a continuous belt 26 which is driven by an appropriate motor 28. The belt 26 extends through the pasteurization chamber 16 and also through the inlet and outlet openings 20, 22 in the housing 12. In addition, the belt 26 may be constructed of a pervious material, such as stainless steel wire mesh, to provide maximum exposure to the underside of the food products.

A number of elongated upper and lower plenum fingers 30 and 32, respectively, are positioned above and below the belt 26, respectively. Each plenum finger 30, 32 comprises a generally open base portion 34, a sloping diverter plate 36 which extends at an acute angle from the base portion, a horizontal slot plate 38 which extends generally perpendicularly from the base portion and which includes a plurality of slots 40 through which air may pass, and two triangular side plates 42 which extend between the diverter plate and the slot plate. Each plenum finger 30, 32 is supported in the housing 12 such that the open base portion 34 is positioned over a corresponding aperture in the partition 14. As a result, air in the plenum chamber 18 is allowed to flow through the plenum fingers 30,32 and out the slots 40. Furthermore, the plenum fingers 30, 32 are oriented with the slot plates 38 generally parallel to the belt 26 so that the air exiting the slots 40 will impinge upon the food products.

The plenum fingers 30, 32 may be connected to the partition 14 and otherwise supported in the housing 12 by any suitable means. In addition, the upper plenum fingers 30, the lower plenum fingers 32, or both, may be adjustably supported in the housing 12 so that the distance between the slot plates 38 and the belt 26 may be varied. The design and implementation of such features are described more thoroughly in U.S. Pat. No. 4,940,040, which is hereby incorporated herein by reference.

The pasteurization apparatus 10 also includes one or more fans 44 for circulating air through the pasteurization and plenum chambers 16, 18. Each fan 44 is driven by a corresponding motor 46 which may be mounted, for example, on the rear side wall 12b. In addition, each fan 44 is positioned such that its low pressure side is in communication with the pasteurization chamber 16 and its high pressure side is in communication with the plenum chamber 18. Thus, when the fans 44 are in operation, high pressure air in the plenum chamber 18 is forced in the direction of the phantom arrows labeled "S" in FIG. 1, through the plenum fingers 30, 32, and out the slots 40. In this regard, the pressure of the air in the plenum chamber 18 is such that the air will emit as small jets from each slot 40. From the slots 40, the air will flow through the pasteurization chamber 16 in the direction of the arrows labeled "R" in FIG. 1, and then back into the plenum chamber 18 through the fans 44.

As seen best in FIG. 2, the pasteurization apparatus 10 may include an adjustable damper 48 for regulating the relative amounts of air delivered to the upper and lower plenum fingers 30, 32. The design and implementation of a suitable such damper are described in the aforementioned U.S. Pat. No. 4,940,040.

In accordance with one embodiment of the present invention, a water supply assembly 50 is provided for selectively hydrating the air which is circulated through the pasteurization and plenum chambers 16, 18. The water supply assembly 50 includes one or more nozzles 52 which are positioned in the pasteurization chamber 16 and are connected to a conventional water supply by a supply conduit 54. In one embodiment of the invention, the nozzles 52 may be atomizing nozzles which emit relatively small droplets of water. The water supply assembly 50 may also include a valve 56 for controlling the amount water which is emitted by the nozzles 52, and possibly also conventional a filter and water softening unit 58 and a pressure regulator 60. For purposes which will be made apparent below, the valve 56 may be an electrically controllable solenoid-type valve.

The pasteurization apparatus 10 further includes means for heating the air which is circulated through the pasteurization and plenum chambers 16, 18. In the illustrative embodiment of the invention, this air heating means includes a heat exchanger surface, such as a number of pipes or tubes 62, and one or more heaters 64 for heating the heat exchanger surface. The heater 64 can be any device which is capable of generating a desired amount of heat in the tubes. For example, a suitable heater for the present invention comprises an indirect gas-fired heater. In this case, the heating means may include a series of pipes which are heated by one or more burners that fire into the ends of the pipes. Moreover, the heater 64 may be controllable so that the amount of heat generated by the tubes 62 can be regulated.

The heat exchanger tubes 62 may be positioned in the pasteurization chamber 16 upstream of the fans 44. In addition, the nozzles 52 may be positioned to emit a spray of water directly onto the tubes 62 so that the water droplets will evaporate on contact with the tubes. In this manner, the air can be both heated and moisturized to a desired level and then thoroughly mixed by the fans 44 prior to entering the plenum chamber 18. This heated, moist air will consequently be supplied to the plenum fingers 30, 32, and the resulting jets of heated, moist air will be emitted from the slots 40 onto the food products which are carried on the conveyor belt 26.

The temperature, humidity and velocity of the air in the pasteurization chamber 16 may be monitored with a suitable number temperature sensors T1, T2, humidity sensors H1, H2 and air velocity sensors V1, V2. In addition, the surface temperature of the food products entering the pasteurization chamber 16 may be detected using a temperature sensor T3, and the speed of the conveyor belt may be determined using a belt speed sensor S. Each of the temperature sensors T1, T2 and T3 can comprise, for example, a conventional resistance temperature detector ("RTD") sensor. Also, one or more of the temperature, humidity and air velocity sensors may be packaged together in a single detector. The design, selection and operation of the temperature, humidity, air velocity and belt speed sensors are well known to the person of ordinary skill in the art and therefore do not need to be discussed further.

The pasteurization apparatus 10 may also include a computer 66 to aid in controlling the pasteurization process. The computer 66 may comprise a suitable controller 68, such as a programmable logic controller, an appropriate interface 70 for connecting the various components of the pasteurization apparatus 10 to the controller, a system memory 72 for storing information regarding the pasteurization process, an input device 74, such as a keyboard, to enable an operator to communicate with the controller, and a display device 76 for conveying certain information from the computer to the operator. A more detailed description of a suitable computer for the pasteurization apparatus 10 can be had by reference to U.S. Pat. No. 6,410,066, which is commonly owned herewith and is hereby incorporated herein by reference.

In operation of the pasteurization apparatus 10, the fans 44 are activated to circulate the air between the pasteurization chamber 16 and the plenum chamber 18 in the manner discussed above. In this regard, the fans 44 may be operated at a constant speed which is predetermined empirically based on the type, size and weight of the food product to be sterilized, the speed of the conveyor belt 26 and the desired temperature and humidity of the air in the pasteurization chamber 16. The heater 64 is also activated to heat the air to a predetermined temperature, and the valve 56 is opened to hydrate the air to a predetermined humidity level. The temperature and humidity of the air may be determined empirically for a given food product to achieve a desired heating and drying effect on the surface of the food products, as will be discussed below. The warm, moist air is circulated through the plenum chamber 18 and the plenum fingers 30, 32 and then emitted as jets from the slots 40.

The food products to be pasteurized are then fed onto the conveyor belt 26 in a single or multi-layer arrangement using a suitable infeed conveyor 78, such as an inlet vibratory conveyor. The food products are transported by the conveyor belt 26 into the pasteurization chamber 16 and through the air jets emitting from the upper and lower plenum fingers 30, 32. Since the initial temperature of the surface of the food products will be lower than the dew point temperature of the moist, hot air in the pasteurization chamber 16, the steam in the air will condense on the surface of the food products and the resulting heat of condensation will be transmitted to the surface of the food products. By maintaining the temperature and humidity of the air suitably high, the heat of condensation will be sufficient to achieve a desired kill rate for the pathogenic microorganisms or other contaminants that may be present on the food products. Therefore, given a desired "kill" rate, or log cycle reduction, the required air temperature and humidity can be determined empirically for each of a number of different air velocities and conveyor belt speeds.

As the food products progress through the pasteurization chamber 16, the temperature of the surface of the food products will gradually increase. Eventually, this temperature will reach the dew point temperature of the moist, hot air in the pasteurization chamber 16. When this happens, the water in the air will no longer condense on the surface of the food products. Instead, the energy of the air jets emitting from the slots 40 will cause the water on the surface of the food products to evaporate. This process will continue until the surface of the food products is substantially dry. The evaporation of the water from the surface of the food products will also tend to cool the food products somewhat.

The pasteurization apparatus 10 may further include a conventional separator 80 and a standard air knife 82 for processing the food products as they exit the pasteurization chamber 16. The separator 80 functions to separate certain of the food products from the others based on predetermined criteria. The air knife 82 propels a stream of relatively dry, cool and filtered air toward the food products to further dry and cool the food products. The design, implementation and operation of the separator 80 and the air knife 82 are well known to persons skilled in the art and therefore do not need to be described further.

In an alternative embodiment of the invention, the pasteurization apparatus 10 also comprises a water recirculator 84 for circulating water from the bottom of the housing 12 back to the water supply assembly 50. The water recirculator 84 includes a return conduit 86 which is connected to a drain 88 in the bottom 12e of the housing 12, a valve 100 for selectively opening the drain, and a pump 102 for conveying the water to the water supply assembly 50. The valve 100 may be an electrically controllable solenoid-type valve which can be operated by the computer 66. A particular advantage of the water recirculator 84 is that, since the water in the bottom of the housing 12 is usually at an elevated temperature, much less heat is required to vaporize this water on the heat exchanger tubes 62.

In accordance with the present invention, the computer 66 controls the speed of the conveyor belt 26 and the temperature, humidity and velocity of the air in the pasteurization chamber 16 by controlling the conveyor motor 28, the heater 64, the valve 56 and the fan motors 46. In addition, the computer 66 may monitor the speed of the conveyor belt 26, the temperature, humidity and velocity of the air in the pasteurization chamber 16, and the initial surface temperature of the food products using the sensors S, T1, T2, H1, H2, V1, V2 and T3, respectively. Accordingly, the computer 66 is capable of controlling the pasteurization process to achieve a targeted reduction in the contaminants on the food products.

In one embodiment of the invention, the computer 66 includes a process control program to control the pasteurization process in accordance with specific temperature and humidity profiles which are determined empirically to achieve a desired microbial kill rate within a fixed period of time for a specific food product. In addition, the computer 66 may comprise a process deviation program which includes a real-time mathematical model that calculates the time and temperature required to achieve the desired kill rate and effects a process correction if, for example, the temperature or humidity of the air in the pasteurization chamber deviates from its corresponding predetermined profile. The computer 66 may also include a program which can model the sub-skin temperature of the dry food product as an aid in determining the required pasteurization time, and a program which will record the entire pasteurization process for future reference. The design and implementation of these programs are described more fully in the aforementioned U.S. Pat. No. 6,410,066.

Figure 4:
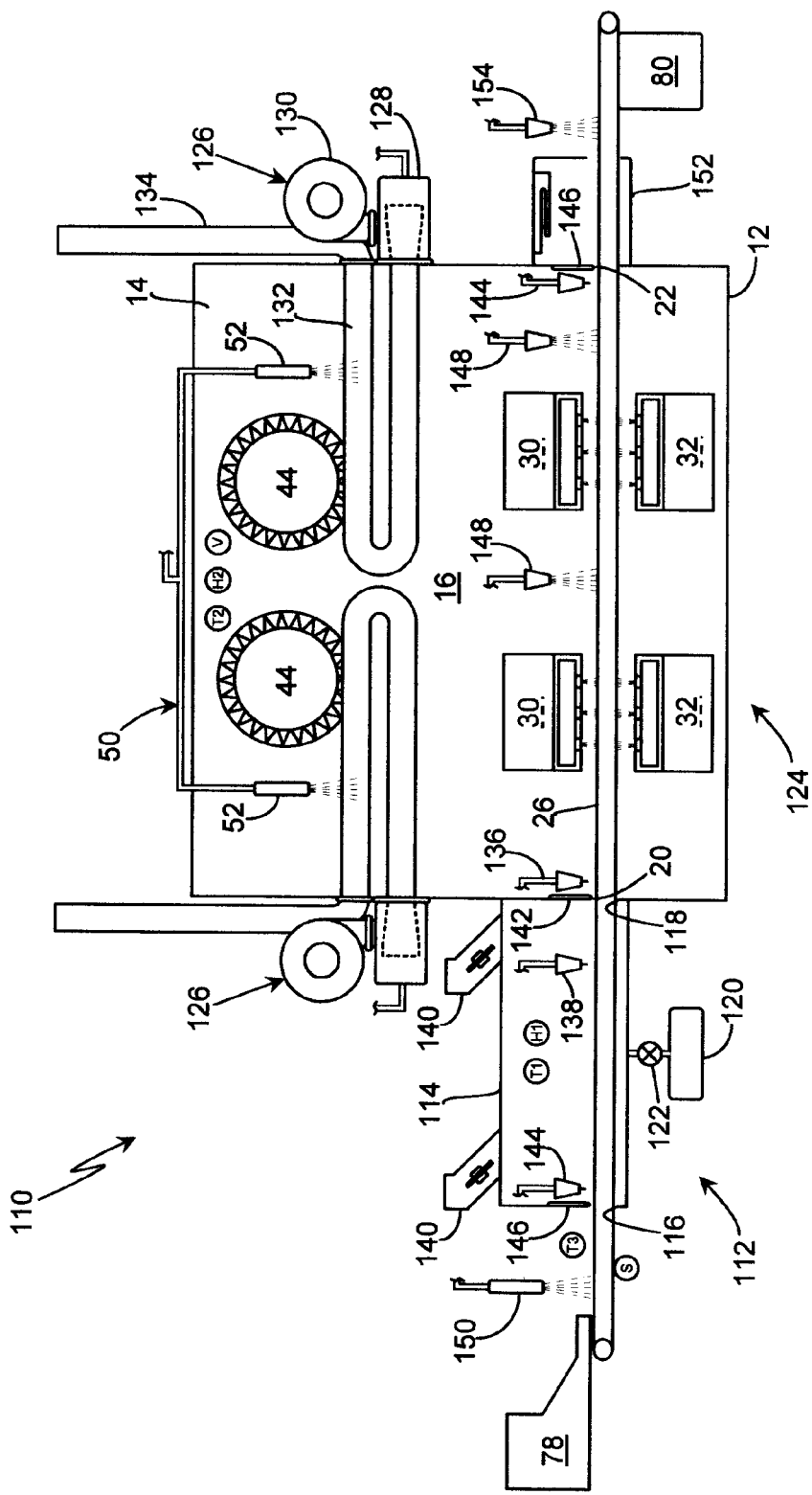
FIG. 4 is a schematic representation of a second embodiment of the pasteurization apparatus of the present invention.

Another embodiment of the pasteurization apparatus of the present invention is illustrated in FIG. 4. The pasteurization apparatus of this embodiment, which is indicated generally by reference number 110, comprises many of the same components which were described above in connection with the pasteurization apparatus 10. Therefore, the same reference numbers will be used to refer to these components in the following description of the pasteurization apparatus 110.

In contrast to the pasteurization apparatus 10, the pasteurization apparatus 110 comprises individual steam and impingement zones for effecting the pasteurization of the dry food products. In the steam zone, the dry food products are exposed to partially of fully saturated steam at a temperature equal to or slightly below about 212° F. This steam will condense on the surface of the dry food products, and the resulting heat of condensation will thermally inactivate a substantial portion of the pathogenic microorganisms that may be present on the dry food products. In the impingement zone, the dry food products on the conveyor belt 26 are exposed to jets of heated, moist air at a temperature above about 212° F. Until the temperature of the surface of the dry food products reaches the dew point temperature of the heated, moist air in the impingement zone, the moisture in the air will condense on the surface of the dry food products and the resulting heat of condensation will thermally inactivate a desired percentage of the pathogenic microorganisms which were not killed in the steam zone. The jets of air will then evaporate this condensate to dry the food products before they exit the impingement zone. By separating the steam and impingement zones in this manner, the operating conditions for each zone can be separately controlled to achieve an optimum microbial kill rate.

In the embodiment of the invention which is illustrated in FIG. 4, the steam zone is exemplified by a steam chamber 112 which comprises a housing 114 that includes opposed inlet and outlet openings 116, 118 through which the conveyer belt 26 passes. The steam chamber 112 may comprise any conventional apparatus for creating a desired steam environment for the dry food products passing through on the conveyor belt 26. In an exemplary embodiment of the invention, the steam chamber 112 may include a steam generator 120, a valve 122 for controlling the flow of steam from the steam generator to the housing 114, and a pressure regulator (not shown) for maintaining the pressure of the steam at a desired level regardless of pressure fluctuations in the steam generator. In addition, the steam chamber 112 may include a number of sensors, such as a temperature sensor T1 and a humidity sensor H1, for detecting the temperature and saturation level of the steam, and a suitable controller, such as the computer 66 described above, for controlling the steam generator 120 and/or the valve 122 to maintain the steam at a desired temperature and saturation level. In one embodiment of the invention, the steam in the housing 114 is maintained at a temperature equal to or slightly below about 212° F. and at a humidity level between about 90% MV and 100% MV. Further details of the steam chamber 112 may be obtained by referring to U.S. Pat. Nos. 5,609,095 and 5,960,703, which are hereby incorporated herein by reference.

The impingement zone is exemplified by an impingement chamber 124, which is similar in many respects to the construction and operation of the pasteurization apparatus 10 described above. Thus, the impingement chamber 124 includes a housing 12, a generally vertical partition 14 which divides the housing into a front pasteurization chamber 16 and a rear plenum chamber 18 (which is not visible in FIG. 4), and opposed inlet and outlet openings 20, 22 which allow the conveyor belt 26 to pass through the pasteurization chamber. The impingement chamber 124 also includes a number of upper and possibly also lower plenum fingers 30 and 32, respectively, and one or more fans 44 for circulating air from the pasteurization chamber 16, into the plenum chamber 18 and through the plenum fingers.

The impingement chamber 124 may also include means for heating the air which is circulated through the plenum fingers 30, 32. As shown in FIG. 4, for example, the impingement chamber 124 includes a number of heating devices 126, each of which comprises a gas heater 128 for igniting an air/gas mixture which is circulated by a blower 130 through a heating tube 132 that extends into the pasteurization chamber 16. In this manner, heat from the combustion of the air/gas mixture in the heating tube 132 is transferred to the air in the pasteurization chamber 16. The by-products of this combustion are then exhausted through a flue exhaust 134. An exemplary blower and gas burner assembly which is suitable for use in the present invention is the Tube-O-Therm® gas burner which is available from Maxon Corporation of Muncie, Ind.

The impingement chamber 124 may further include means for hydrating the air which is circulated through the plenum fingers 30, 32. For example, the impingement chamber 124 may include a water supply assembly 50 which is similar to the water supply assembly described above in connection with the pasteurization apparatus 10. The water supply assembly 50 includes a number of nozzles 52 for spraying atomized droplets of water onto the heating tubes 132 or into the inlets of the fans 44. When these droplets of water contact the heating tubes 132, the heat from the heating tubes will cause the water to evaporate, and the resulting heated, moist air will be circulated through the plenum fingers 30, 32 and onto the dry food products. Furthermore, the computer 66 may control the heating devices 126 and the water supply assembly 50 to maintain the temperature and moisture level of the air at desired levels. In one embodiment of the invention, the air in the impingement chamber 124 is maintained at a temperature above about 212° F., such as between about 250° F. and 400° F., and at a humidity level between about 72% to 88% MV.

Although the steam chamber 112 and the impingement chamber 124 have been described as comprising separate housings 114 and 12, respectively, they may in fact be located in separate portions of the same housing. In this example, the outlet opening 118 of the steam chamber 112 and the inlet opening 20 of the impingement chamber 124 may comprise the same opening in a partition which is located in the common housing. Alternatively, the outlet opening 118 of the steam chamber 112 and the inlet opening 20 of the impingement chamber 124 may comprise an open interface between separate portions of the common housing.

Referring still to FIG. 4, the pasteurization apparatus 110 may also include means for isolating the steam in the steam chamber 112 from the heated, moist air in the impingement chamber 124 and, if necessary, the ambient environment, in order to better control the saturation level of the steam. In one embodiment of the invention, the isolation means may include a steam knife 136 which is positioned at the interface between the steam chamber 112 and the impingement chamber 124 and which generates a curtain of steam that effectively separates these chambers while allowing the dry food products to pass through without interference. The steam knife 136 may comprise a conventional air knife which is connected to a source of steam (not shown), rather than air. The steam knife 136 will therefore prevent the heated, moist air in the impingement chamber 124 from migrating into the steam chamber 112. In order to provide greater flexibility in maintaining the steam at a desired saturation level, the steam knife 136 may be adjustable to vary the height and angle of the air curtain.

In another embodiment of the invention, the isolation means may include a second steam knife 138 which is positioned in the steam chamber 112 a short distance from the first steam knife 136. In addition, a non-powered vent stack 140 may be connected to the steam chamber 112 between the first and second steam knifes 136, 138. This embodiment is particularly useful when it is desired to maintain the steam at or near a fully-saturated level and close to or at 212° F. In operation, the first steam knife 136 prevents the heated, moist air in the impingement chamber 124 from migrating into the steam chamber 112, while the second steam knife 138 prevents the steam in the steam chamber from leaking into the impingement chamber. If any heated, moist air should slip past the first steam knife 136, it will simply be discharged through the vent stack 140, as will any steam that slips past the second steam knife 138.

In addition or as an alternative to the steam knifes 136, 138, the isolation means may include a suitable gate 142 which is positioned between the steam chamber 112 and the impingement chamber 114. Also, additional steam knifes 144 and/or gates 146 may be positioned at the inlet opening 116 of the steam chamber 112 and at the outlet opening 22 of the impingement chamber 124 in order to help isolate these chambers from the ambient environment.

The pasteurization apparatus 110 may also include many of the same components described above in connection with the pasteurization apparatus 10 to sense and control the process parameters in the impingement chamber 124. For example, the pasteurization apparatus 110 may comprise a number of temperature, humidity and velocity sensors T2, H2 and V for monitoring the temperature, humidity and velocity of the air in the impingement chamber 114. In addition, the pasteurization apparatus 110 may include a temperature sensor T3 for detecting the surface temperature of the dry food products entering either the steam chamber 112, the impingement chamber 114, or both, and a speed sensor S for detecting the speed of the conveyor belt 26. In response to the signals generated by these sensors, the computer 66 will control the various components of the pasteurization apparatus 110 in order to achieve a desired microbial kill rate for the dry food products.

In operation of the pasteurization apparatus 110, the dry food products are fed onto the conveyor belt 26 using a suitable infeed conveyor 78, such as the Syntron® vibratory conveyor manufactured by FMC Technologies, Inc. of Homer City, Pa. The conveyor belt 26 transports the dry food products through the steam chamber 112 and then the impingement chamber 124. The dwell times of the dry food products in the steam chamber 112 and the impingement chamber 124 are selected to effect a desired microbial kill rate and certain quality attributes of the dry food products. Also, the conveyor belt 26 may actually comprise two or more belts which are driven separately so that the dwell times in each of the steam chamber 112 and the impingement chamber 124 can be controlled independently.

In the steam chamber 112, the steam generator 120 is activated to deliver a continuous supply of steam to achieve a predetermined temperature and saturation level. As the dry food products progress through the steam chamber, the steam will condense on the surface of the dry food products and thereby generate a heat of condensation which will rapidly heat the surface. This heat will be sufficient to kill a substantial portion of the pathogenic microorganisms that are present on the surface of the dry food products.

In the impingement chamber 126, the heating devices 126 and the water supply assembly 50 are activated to heat and hydrate the air to a desired temperature and humidity level, and the fans 44 are activated to circulate this heated, moist air through the plenum fingers 30, 32 and onto the dry food products at a predetermined velocity. By properly controlling the temperature and humidity level of the air in the impingement chamber 124, the dew point temperature of this air can be maintained above the surface temperature of the dry food products exiting the steam chamber 112. Consequently, the moisture in the air in the impingement chamber 124 will condense on the surface of the dry food products, and the resulting heat of condensation will kill a desired percentage of the pathogenic microorganisms which were not killed in the steam chamber 112.

Moreover, as the dry food products progress through the impingement chamber 124, their surface temperature will gradually increase until it reaches the dew point temperature of the heated, moist air, at which point the moisture will no longer condense on the surface of the food products. Once this happens, the energy from the air jets emanating from the plenum fingers 30, 32 will cause the moisture on the surface of the dry food products to evaporate, which will in turn slightly cool the surface of the food products. If the surface of the dry food products cools to below the dew point temperature, the moisture in the air will once again condensate on the surface. This subsequent condensation step will re-heat the surface and kill more pathogenic microorganisms. Once the surface temperature of the food products increases above the dew point temperature, the air jets emanating from the plenum fingers 30, 32 will again cause the moisture on the surface of the dry food products to evaporate. This evaporation and re-condensation process will continue until the surface temperature of the food products is sufficiently high to prevent further condensation.

The impingement zone 124 may also comprise means for producing a pulsating flow of air onto the dry food products to facilitate the evaporation of the moisture from the surface of the dry food products. Such means may comprise, for example, the fans 44, which when operated intermittently will produce a pulsating flow of air that is circulated through the plenum fingers 30, 32 and onto the dry food products. As an alternative or in addition to the fans 44, the impingement chamber 114 may comprise a number of steam knifes 148 or the like, which may be operated intermittently to generate the pulsating air flow. This pulsating air flow will assist in evaporating the moisture from the dry food products traveling through the impingement chamber 124. Thus, by positioning and operating the pulsating air flow means appropriately, the length of the impingement chamber 124 in which condensation takes place can be altered to achieve a desired pasteurization effect.

Referring still to FIG. 4, the pasteurization apparatus 110 may also comprise a suitable sprayer 150 or the like for wetting the dry food products prior to their entering the steam chamber 112. This feature has a number of advantages. First, the published literature suggests that bacteria are less resistant to heat under moist surface conditions. Also, wetting the dry food products maintains the temperature of the food products below the dew point temperature for a longer period of time, which therefore allows the heat in the steam chamber 112 to act on the pathogenic microorganisms for a longer time. Furthermore, studies have shown that the product output quality may be improved when the product is wetted prior to undergoing the pasteurization process.

As an alternative or in addition to the sprayer 150, a number of steam knives (not shown), which can be similar to the steam knife 138, may be positioned in the central portion of the steam chamber 112 to effectively and uniformly wet the dry food products, especially when they are loaded in multiple layers on the conveyor belt 26. These steam knives will also serve to slightly agitate the dry food products, which will result in a more uniform distribution of steam on the surface of the food products.

As an alternative or in addition to the use of the heated-air impingement process to dry the surface of the food products in the impingement chamber 124, the pasteurization apparatus 110 may comprise a separate dryer for this purpose. For example, the pasteurization apparatus may include a conventional infrared dryer 152 which is positioned over the conveyer belt 26 either inside or, as shown in FIG. 4, immediately outside the impingement chamber 124. An advantage of the infrared dryer 152 is that it may be operated to achieve surface drying only, without risking cooking the interior of the dry food product. When the infrared dryer 152 is used as the primary means to dry the food products, the heated-air impingement process may not be required. Consequently, the impingement chamber 124 may be used solely for generating the heated, moist air which produces the condensation on the surface of the food products that in turn effects the killing of the pathogenic microorganisms.

The pasteurization apparatus 110 may also include a standard air knife 154 and a conventional separator 80 for further processing the dry food products as they exit the impingement chamber 124. The air knife 154 emits a stream of relatively dry, cool and filtered air to further dry and cool the food products, and the separator 80 functions in a well known manner to separate certain of the food products from the others based on predetermined criteria.

Another embodiment of the pasteurization apparatus of the present invention is illustrated in FIGS. 5 and 6. The pasteurization apparatus of this embodiment, which is indicated generally by reference number 210, is similar in many respects to the pasteurization apparatus 110 described above. Thus, the pasteurization apparatus 210 comprises an infeed conveyor 78 for depositing the dry food products onto a conveyor belt 26, a steam chamber 112 for generating steam at a desired temperature and humidity level, and an impingement chamber 124 for generating a flow of heated, moist air at a predetermined velocity, temperature and humidity level. The construction and operation of the steam chamber 112 and the impingement chamber 124 are substantially as described above.

Although not material to the present invention, the pasteurization apparatus 210 may also include a conventional lift assembly 212 for lifting an upper portion of the housing 12 of the impingement chamber 124 above the conveyor belt. In addition, a number of exhaust ducts 214 may be provided for venting the air from the housing 12 while the pasteurization apparatus is in use. In this regard, each exhaust duct 214 may be secured to the housing 114 of the steam chamber 112 and an inlet opening in the exhaust duct connected to a corresponding outlet opening in the upper portion of the housing 12 through a convention slide fitting (not shown). In this manner, the upper portion of the housing 12 may be raised and lowered while the exhaust ducts 214 remain securely supported on the housing 114. The construction and operation of the lift assembly 212 and the exhaust ducts 214 are well known to persons of ordinary skill in the art and therefore need not be described further.

Yet another embodiment of the pasteurization apparatus of the present invention is illustrated in FIGS. 7 and 8. The pasteurization apparatus of this embodiment, which is indicated generally by reference number 310, is similar in many respects to the pasteurization apparatus 110 described above. Thus, the pasteurization apparatus 310 comprises an infeed conveyor 78 for depositing the dry food products onto a conveyor belt 26, a steam chamber 112 for generating steam at a desired temperature and humidity level, and an impingement chamber 124 for generating a flow of heated, moist air at a predetermined velocity, temperature and humidity level. The construction and operation of the steam chamber 112 and the impingement chamber 124 are substantially as described above.

In this embodiment, the steam chamber 112 is constructed in accordance with the teachings of the aforementioned U.S. Pat. No. 5,609,095. Accordingly, the steam chamber 112 includes a plateau-shaped portion 312 over which the conveyor belt 26 travels and two vent stacks 314 which are connected to corresponding ends of the steam chamber below the plateau-shaped portion. This arrangement facilitates maintaining the temperature of the saturated steam near 212° F. in the area of the plateau-shaped portion 312.

Figure 9:
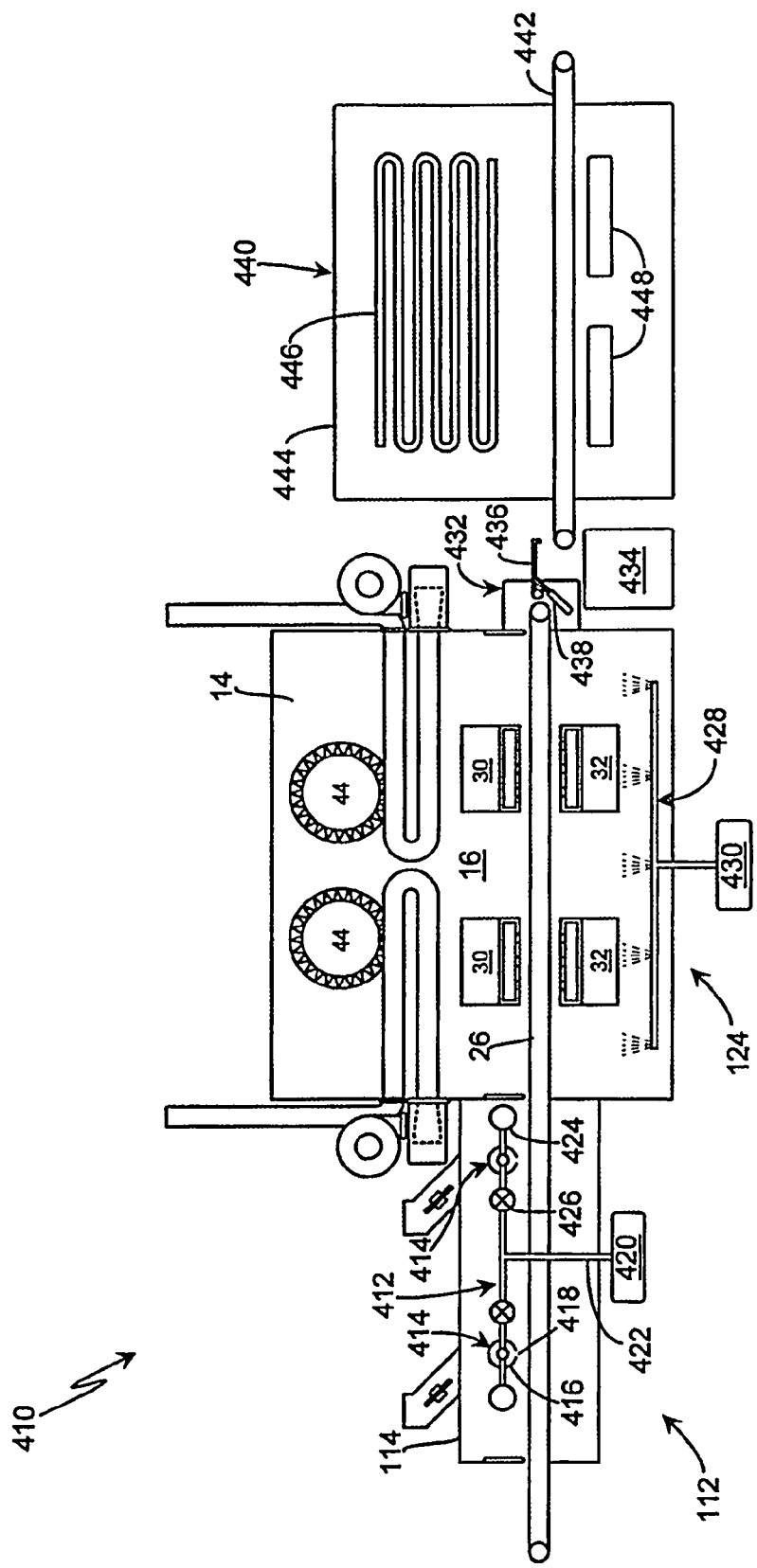
FIG. 9 is a schematic representation of yet another embodiment of the pasteurization apparatus of the present invention.
Figure 11:
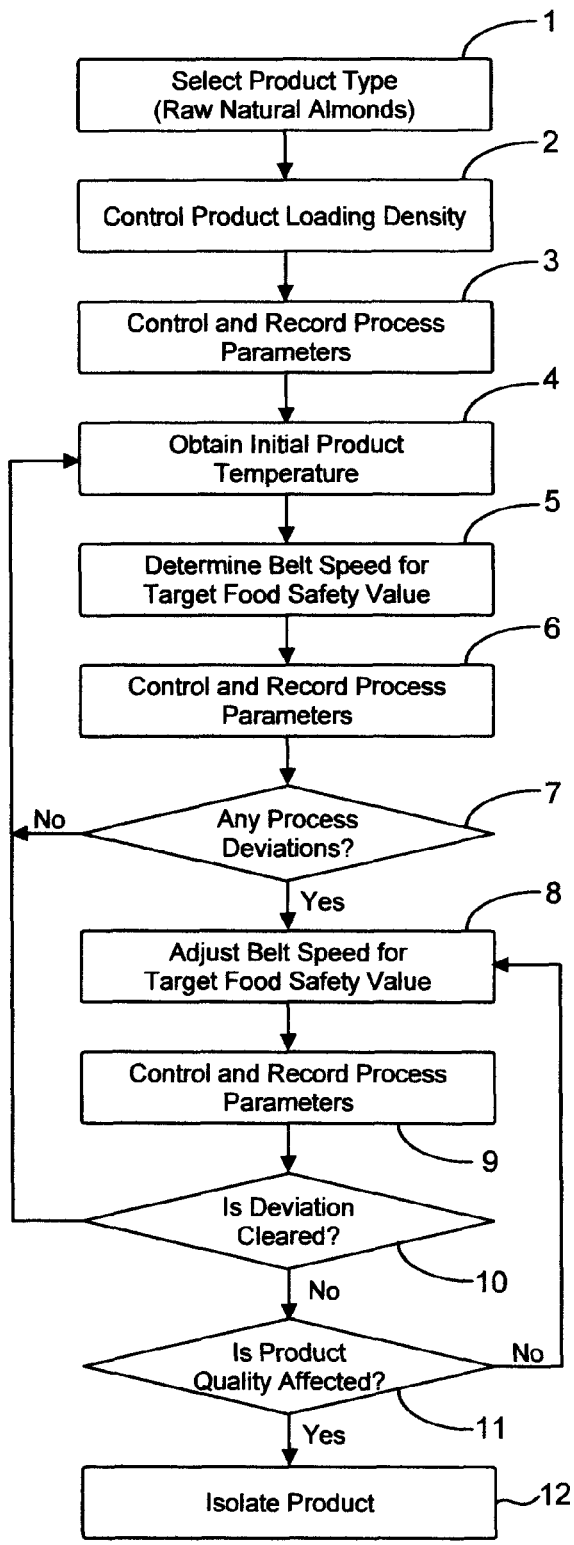
FIG. 11 is a process flowchart showing one possible method of operating the pasteurization apparatus of the present invention.

Referring now to FIG. 9, another embodiment of a pasteurization apparatus of the present invention is shown which includes several features not heretofore described. The pasteurization apparatus of this embodiment, generally 410, is similar in many respects to the construction and operation of the pasteurization apparatus 110 described above. For purposes of clarity, however, several components of the pasteurization apparatus 110 have been omitted from FIG. 9.

In this embodiment of the invention, the steam chamber 112 comprises a steam knife assembly 412 which is particularly suitable for maintaining the temperature and saturation level of the steam in the housing 114 relatively consistent. The steam knife assembly 412 comprises at least one and preferably two conventional steam knives 414, each of which can be similar in construction and operation to the steam knives discussed above. As shown in FIG. 9, each steam knife 414 includes an elongated manifold pipe 416 which extends between the sides of the housing 114 and comprises a longitudinal slit 418 through which the steam emanates. In addition, each manifold pipe 416 is fluidly connected to steam generator 420 via a steam conduit 422. The steam knives 414 may be positioned either above the conveyor belt 26 and directed downwards, below the conveyor belt and directed upwards, or both above and below the conveyor belt.

The manifold pipes 416 are preferably rotatably supported in the housing 114 so that the orientation of the slit 418 relative to the conveyor belt 26 can be varied. In addition, the pressure of the steam emanating from each steam knife 414 may be monitored by a suitable pressure gage 424 and controlled by a valve 426. In this manner, the pressure of the steam and the orientation of the slit 418 can be set to achieve specific process conditions for a given pasteurization application, which process conditions may be determined empirically.

Also, as an alternative or in addition to the water supply assembly 50, the pasteurization apparatus 410 may comprise a conventional steam sparge 428 for moisturizing the air in the impingement chamber 124. The steam sparge 428, which can have a diameter of, e.g., 4 inches, may be mounted in the pasteurization chamber 16 and connected to an external steam generator 430. Furthermore, although not depicted in FIG. 9, the steam generator 420 for the steam chamber 112 and the steam generator 430 for the steam sparge 428 may be the same steam generator. In this case, however, the steam chamber 112 ideally will comprise a pressure regulator to prevent the pressure in the steam chamber from being adversely affected by pressure fluctuations in the steam generator.

Referring still to FIG. 9, the pasteurization apparatus 410 comprises a product separator in the form of a flip gate assembly 432 which is mounted over a collection bin 434. The flip gate assembly 432 includes a flip gate 436 which is pivotably connected to a support structure and is held in a alignment with the conveyor belt by a preferably solenoid-controlled actuator 438. In operation, when the pasteurization apparatus 410 determines that a number of dry food products likely will not be pasteurized to the extent desired, the computer 66 will deactivate the infeed conveyor 78 to stop the flow of dry food products onto the conveyor belt 26 and then activate the solenoid 438 to lower the flip gate 436 and allow the dry food products already on the conveyor belt to fall into the bin 434.

The pasteurization apparatus 410 may also comprise a cooler 440 for cooling the dry food products to a desired temperature prior to packaging. As shown in FIG. 9, the cooler 440 comprises a conveyor 442 which is aligned with the conveyor belt 26 or, if present, the flip gate 436. Although the cooler 440 can comprise any conventional cooling apparatus, it specifically may comprises a housing 444 through which the conveyor 442 passes, a standard refrigeration assembly 446 for cooling the air within the housing, and a number of fans 448 for circulating the air through the dry food products and the housing.

In any of the embodiments discussed above, the infeed conveyor 78 and/or the belt conveyor 24 may be controlled to obtain a desired loading of the dry food products on the conveyor belt 26. Referring to FIG. 10, for example, the infeed conveyor 78 may comprise a hopper 450 which is supported on a frame 452 and which discharges into a conveyor pan 454 that is driven by a motor 456. In this embodiment, the motor 456 is controlled by the computer 66 and the weight of the hopper 450 is measured by a conventional load sensor L. In addition, the speed of the motor 456 is selected so that the conveyor pan 454 will discharge the dry food products at a rate which is sufficient to achieve a desired loading of the dry food products on the conveyor belt 26, such as to the level of the bottom of the gate 146, for example. This discharge rate in turn requires that the hopper 450 contain a corresponding minimum amount of the dry food products at all times. In operation, therefore, the computer 66 will monitor the weight of the dry food products in the hopper 450 and, if the weigh falls below the minimum amount, the computer will adjust the speed of the motor 456 correspondingly to ensure that the desired loading is maintained.

The loading of the dry food products on the conveyor belt 26 may also be controlled in part by adjusting the height of the gate 146. In this embodiment, the gate 146 is ideally adjustably connected to the housing 114 of the steam chamber 112 by, for example, a number of stud and nut assemblies 458 which extend through corresponding vertically oriented slots in the gate. Thus, by adjusting the height of the gate 146, the maximum thickness, or loading density, of the dry food products entering the steam chamber 112 may be controlled. Furthermore, the gate 146 may comprise a lower portion 460 which is hinged to an upper portion 462 and which will therefore swing away if contacted by the dry food products to prevent the gate 146 from damaging the dry food products. In addition, the hinged lower portion 460 allows the gate 146 to be positioned relatively close to the dry food products on the conveyor belt 26 to better contain the steam within the steam chamber 112. A similar construction may be employed for the other gates 142, 146.

In each of the embodiments described above, the computer 66 is ideally programmed to control the pasteurization process in order to maintain certain desired process conditions, such as predetermined temperature and/or humidity profiles, in each of the steam chamber and the impingement chamber. These process conditions may be determined empirically to achieve a desired microbial kill rate for a specific dry food product within a specific period of time. In order to perform this control function, the computer 66 monitors certain process parameters, such as one or more of the initial temperature of the food product ($T_i$), the temperature of the steam in the steam chamber 112 ($T_{steam}$), the temperature and moisture content of the air in the impingement chamber 124 ($T_{oven}$, $H_{oven}$), the speed of the fans 44 ($V_{fan}$), and the speed of the conveyor belt 26 ($V_{belt}$). Based on these process parameters, which may be measured with the sensors described above, the computer 66 then adjusts certain components of the pasteurization apparatus to ensure that the pasteurization process will achieve the desired microbial kill rate.

This process control program may be similar to the process control program described in the aforementioned U.S. Pat. No. 6,410,066. The computer 66 will execute the process control program to both start the pasteurization apparatus and then control the apparatus in order to maintain the process conditions at or near their predefined values during the entire pasteurization process. Prior to starting the pasteurizing apparatus, however, the user may manually adjust certain components, such as the distance from the plenum fingers 30, 32 to the belt 26, the angle of the damper 48 and the height of the gate 146.

When the user prompts the computer 66 to start the pasteurization apparatus, the computer will activate the fans 44 and the conveyor belt 26 and run these components at their corresponding predefined speeds. The computer 66 will then activate the heaters 126 in order to bring the temperature of the air in the impingement chamber 124 up to its predefined level. When the temperature in the impingement chamber 124 reaches its set point, as determined by the temperature sensors in the impingement chamber, the computer 66 will activate the water supply assembly 50 and/or the steam generator 430 to bring the moisture volume of the air in the impingement chamber 124 up to its predefined level. When the moisture volume of the air in the impingement chamber 124 reaches its set point, as determined by the humidity sensor in the impingement chamber, the computer will open the valve 122 to allow steam to enter the steam chamber 112.

When the temperature of the steam in the steam chamber 112 reaches its set point, as determined by the temperature sensor in the steam chamber, the computer 66 is ready to activate the infeed conveyor 78 in order to begin pasteurizing a specific batch of the dry food products. At this point, the computer 66 may prompt the user to enter the type and initial temperature of the dry food product and certain other batch information. As the pasteurization process proceeds, the computer 66 will monitor the process conditions in the steam and impingement chambers and, if necessary, control the various components of the pasteurization apparatus, such as the steam generator 120 or the heaters 126, in order to maintain the process conditions at or near their predefined values.

Another example of a suitable control program which the computer 66 may use to control the pasteurization apparatus is illustrated schematically in FIG. 10. This control program, which is described more fully in the aforementioned U.S. Pat. No. 6,410,066, combines the process control program just described with a process deviation program that adjusts certain components of the pasteurization apparatus when the computer 66 detects certain deviations between the process conditions and their predetermined values.

In accordance with this program, the operator first selects the specific type of dry food product which will be pasteurized, such as raw natural almonds (step 1). Based on this product, the computer 66 operates the infeed conveyor 78 to effect a desired loading of the almonds on the conveyor belt 26 (step 2), and activates certain other components of the pasteurization apparatus, such as the steam generator 120, the fans 44, the heating devices 126 and the water supply assembly 50, to create the predetermined process conditions within each of the steam chamber 112 and the impingement chamber 124 (step 3). The computer 66 then obtains the initial temperature of the almonds (step 4) and, using well-known pasteurization equations, calculates the conveyor belt speed which is required to achieve a target microbial kill rate, e.g., a 5 log reduction in the pathogenic microorganisms (step 5). If required, the computer 66 adjusts the conveyor belt speed, proceeds to sense the process conditions in each of the steam chamber 112 and the impingement chamber 124 and adjusts the components of the pasteurization apparatus, such as the fan, the heater and the water supply assembly, to maintain the temperature and humidity levels consistent with their corresponding profiles (step 6).

The computer 66 then compares certain of the process conditions determined in step 6, such as the temperature and moisture level of the air in the impingement chamber 124, with their corresponding predetermined values and determines whether any deviations exists between these values (step 7). If no deviations exist, the computer 66 will continue to operate the pasteurization apparatus in the normal fashion by cycling back to step 4. However, if a deviation does exist, the computer 66 will adjust the conveyor belt speed in a predefined fashion in an attempt to achieve the target microbial kill rate (step 8). The computer 66 will then sense the process conditions once again (step 9) and compare these values to their corresponding predetermined values to determine if the deviation has been cleared (step 10).

If the deviation has been cleared, the computer will continue to operate the pasteurization apparatus in the normal fashion by cycling back to step 4. If the deviation has not been cleared, the operator will decide whether the quality of the almonds has been affected (step 11). If it has, the almonds will be isolated (step 12). If the quality of the almonds has not been affected, the computer 66 will return to step 8 and once again adjust the conveyor belt speed in a predefined fashion in an attempt to achieve the target microbial kill rate.

In an exemplary embodiment of the present invention, the pasteurization apparatus may comprise a steam chamber 112 which is 6.5 feet long, an impingement chamber 124 which is 22 feet long, an exit zone which is 2.7 feet long, and a conveyor belt which is 40 inches wide. In addition, the edges of the conveyor belt 26 may be curled upwards approximately 0.75 inch to help prevent the dry food products from falling off.

Also, the pasteurization apparatus may include two temperature sensors T1, T2 for monitoring the temperature in the steam chamber 112, two temperature sensors T3, T4 for monitoring the temperature in the impingement chamber 124, and one humidity sensor H1 for monitoring the moisture level in the impingement chamber. The first and second temperature sensors T1, T2 may be positioned above the conveyor belt 26, with the first temperature sensor T1 positioned on one side of the housing 114 about 17.5 inches from the inlet opening 116 and the second temperature sensor T2 positioned on the other side of the housing about 19.5 inches from the exit opening 118. In addition, the third and fourth temperature sensors T3, T4 may be positioned in the plenum chamber 18, with the third temperature sensor T3 positioned about 44 inches from the inlet opening 20 and about 36 inches above the conveyor belt 26 and the fourth temperature sensor T4 positioned about 33 inches from the exit opening 22 and about 39 inches above the conveyor belt. Furthermore, the humidity sensor H1 may be positioned in the plenum chamber 18 adjacent the fourth temperature sensor T4. In this exemplary embodiment of the invention, the temperature sensors may each comprise a Type J thermocouple which is sold by Omega Engineering, Inc. of Stamford, Conn., and the humidity sensor may comprise a Humitrol-II® moisture monitor and control system, which is sold by FMC Technologies, Inc. of Sandusky, Ohio.

The exemplary pasteurization apparatus may also comprise two fans 44 for circulating the heated, moist air through the impingement chamber 124. Both fans 44 may be positioned about 39 inches above the conveyor belt 26. In addition, the first fan 44 may be positioned approximately 87.8 inches from the inlet opening 20 and the second fan 44 may be positioned approximately 175.8 inches from the inlet opening. Each fan 44 may comprise a 30 HP Model 308 PLR plug fan of the type sold by the New York Blower Company of Willowbrook, Ill.

The operating parameters of the pasteurization apparatus will depend on the requirements of a given application, such as the required kill level, the target pathogen and the desired food attributes. The following Table 1 lists some exemplary operating parameters for thermally inactivating a pathogen such as *Salmonella* Enteritidis Phage Type 30 ("SE PT-30") both on any dry food product and on Almonds:

TABLE 1

| Process Conditions | Dry Food | Almonds |
|---|---|---|
| Steam Zone Temp. (° F.) | 200-212 | 204-212 |
| Steam Zone Integrated Average Temp. (° F.) | 205 (nominal) | 207 (nominal) 208.5 (optimal) |
| Impingement Zone Temp. (° F.) | 220-450 (nominal) | 350 (nominal) 385-395 (optimal) |
| Impingement Zone Humidity (% MV) | 60-90 (nominal) | 75-85 (nominal) 78-85 (optimal) |

In Table 1, the Steam Zone Integrated Average Temperature is the average temperature determined from the measurements taken from all of the temperature sensors in the steam zone 112. For example, if the steam zone 112 comprises two temperature sensors T1, T2 which are positioned as described above, the Integrated Average Temperature would be (T1+T2)/2.

In addition, the following Table 2 lists the exemplary process conditions for Challenge Test 5 and Challenge Test 7 in order to achieve a 5 log reduction of SE PT30 on dry raw almonds:

TABLE 2

| Process Conditions | Test 5 | Test 7 |
|---|---|---|
| Min. Steam Chamber Temp., T1 (° F.) | 208.5 | 208.5 |
| Min. Steam Chamber Temp., T2 (° F.) | 208.5 | 208.5 |
| Min. Impingement Chamber Temp., T3 (° F.) | 391.0 | 389.6 |
| Min. Impingement Chamber Temp., T4 (° F.) | 391.0 | 388.9 |

TABLE 2-continued

| Process Conditions | Test 5 | Test 7 |
|---|---|---|
| Min. Fan Speed (% maximum speed) | 60.0 | 60.0 |
| Min. Humidity in Impingement Chamber (% MV) | 82.4 | 78.6 |
| Minimum Almond Initial Temp. | 40.0 | 40.0 |
| Min. Time in Impingement Zone | 25.0 | 25.0 |
| Max. Belt Speed (ft/min) | 52.8 | 52.8 |
| Max. Product Load Density (lb/ft$^2$) | 2.25 | 1.54 |
| Max. Dist. of Top Finger Nozzle to Belt (in) | 3.0 | 3.0 |
| Max. Dist. of Bottom Finger Nozzle to Belt (in) | 2.5 | 2.5 |
| Damper position (% top-% bottom) | 50—50 | 50—50 |

In any pasteurization process, the calculation of the surface pasteurization value and the log reduction number requires knowledge of the surface temperature of the dry food product during processing. Thus, in order to calculate the pasteurization value of the dry food product, the surface temperature of the dry food product needs to be measured. A common method for measuring the surface temperature of a dry food product is to use a thermocouple. However, the temperature which is measured in this manner only represents the temperature at the point where thermocouple is attached, not the average surface temperature of the dry food product.

Referring to FIG. 12, the present invention therefore provides a convenient method for determining the average surface temperature of a dry food product. In accordance with the invention, the surface temperature of a dry food product is measured using a simulated food product, which is indicated generally by reference number 510. The simulated food product 510 ideally comprises the general configuration of the dry food product of interest. In FIG. 12, for example, the simulated food product 510 is generally configured to resemble an almond. In addition, the simulated food product 510 is constructed of a highly heat-conductive material, such as aluminum, copper or silver. In order to measure the temperature of the simulated food product 510, a suitable temperature sensor, such as a thermocouple 512, may be attached to the simulated food product or inserted into a small hole 514 which is formed in the simulated food product.

Due to the high thermally conductive nature of the simulated food product 510, its temperature during the pasteurization process is representative of the average surface temperature of the actual dry food product. The simulated food product 510 can therefore be embedded in the dry food products during the pasteurization process to provide a fairly accurate indication of the average surface temperature of the dry food products.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

We claim:

1. A pasteurizing apparatus for pasteurizing a dry food product based on the heat of condensation from a pasteurization medium without substantially cooking the dry food product, the apparatus comprising:

(a) an impingement chamber comprising a plenum chamber and a pasteurization chamber, said plenum chamber comprising a number of plenum fingers, each of which comprises an open base portion which communicates with the plenum chamber and a number of slots which communicate with the pasteurization chamber;

(b) a conveyor extending through the pasteurization chamber for conveying the dry food product through the pasteurization chamber;

(c) a pasteurization medium supply system in fluid flow communication with the plenum chamber, said pasteurization medium supply system generating a pasteurization medium comprising heated, moist air;

(d) a circulation system for circulating the pasteurization medium from the plenum chamber through the base portion of the plenum fingers, through the slots, into and through the pasteurization chamber and onto the dry food product being carried by the conveyor; and (e) a temperature measurement system for determining an average surface temperature of the dry food product being carried by the conveyor, said temperature measurement system comprising a simulated food product positioned on the conveyor within the dry food product, said simulated food product constructed of a highly heat conductive material and configured to resemble the dry food product, and a temperature sensor which is attached to the simulated food product to sense the temperature of the dry food product on or near the surface of the simulated food product;

(f) a measurement system for measuring the temperature and humidity within the pasteurization chamber; and (g) a control system for controlling the temperature and moisture content of the pasteurization medium supplied to the pasteurization chamber and for controlling the operation of the circulation system to generate a sufficient heat of condensation on the surface of the dry food product being conveyed through the pasteurization chamber, sufficient to kill a desired percentage of pathogenic microorganisms present on the surface of the dry food product, but without substantially cooking the dry food product, said control system:

setting preselected temperature and humidity levels within the pasteurization chamber such that when the pasteurization medium condenses on the surface of the dry food product a heat of condensation is produced that is sufficient to kill a percentage of any pathogenic microorganisms which may be present on the surface of the dry food product without substantially cooking the dry food product; and said control system, if the measured temperature and/or humidity within the pasteurization chamber deviates sufficiently from the preselected temperature and/or humidity levels, altering the temperature and/or moisture content of the pasteurization medium to bring the temperature and/or humidity within the pasteurization chamber to within an acceptable deviation from the preselected temperature and/or humidity levels within the pasteurization chamber.

2. The pasteurizing apparatus of claim 1, wherein the slots are positioned so as to direct the heated, moist air toward the conveyor.

3. The pasteurizing apparatus of claim 2, wherein the number of plenum fingers comprises a number of upper plenum fingers which are located above the conveyor and a number of lower plenum fingers which are located below the conveyor.

4. The pasteurizing apparatus of claim 3, wherein the control system for selectively directs the pasteurization medium in the plenum chamber to either or both of the upper and lower plenum fingers.

5. The pasteurizing apparatus of claim 1, wherein the pasteurization medium supply system comprises a heater which includes a heat exchanger surface that is located in the impingement chamber.

6. The pasteurizing apparatus of claim 5, wherein the pasteurization medium supply system comprises a water supply assembly which is connected to a water supply and which sprays the water from the water supply into the impingement chamber.

7. The pasteurizing apparatus of claim 1, wherein the pasteurization medium supply system comprises a steam generator.

8. A pasteurizing apparatus for pasteurizing a dry food product based on the heat of condensation from saturated steam and based on the heat of condensation from a pasteurization medium without substantially cooking the dry food product, the apparatus comprising:

(a) a steam chamber;

(b) a steam generating system for generating saturated steam and supplying the saturated steam to the steam chamber;

(c) a pasteurization chamber physically separate from the steam chamber, said pasteurization chamber located immediately downstream of the steam chamber;

(d) a pasteurization medium supply system for generating a pasteurization medium comprising heated, moist air and supplying the pasteurization medium to the pasteurization chamber, said pasteurization medium supply system structurally and functionally separate from the steam generating system;

(e) an isolation system configured and positioned to isolate the steam chamber from the pasteurization chamber to retain the saturated steam in the steam chamber and to retain the pasteurization medium in the pasteurization chamber;

(f) a conveyor for conveying the dry food product first through the steam chamber and then through the pasteurization chamber;

(g) a measurement system for measuring the temperature and humidity levels within the steam chamber and the temperature and humidity levels within the pasteurization chamber;

(h) a control system for controlling the temperature, pressure and volume of saturated steam supplied to the steam chamber to enable the steam to condense on the dry food product being conveyed through the steam chamber, to produce a heat of condensation on the dry food product which is sufficient to kill a first percentage of any pathogenic microorganisms present on the surface of the dry food product without substantially cooking the dry food product;

(i) said control system also controlling the pasteurization medium temperature and moisture by volume of the pasteurization medium supplied to the pasteurization chamber so that as the dry food product is conveyed through the pasteurization chamber, the moisture in the pasteurization medium condenses on the surface of the dry food product and produces a heat of condensation which is sufficient to kill a second percentage of the pathogenic microorganisms, but without substantially cooking the dry food product;

(j) said control system setting preselected temperature and humidity levels within the steam chamber such that when the steam condenses on the surface of the dry food product, a heat of condensation is produced that is sufficient to kill a percentage of any pathogenic microorganisms which may be present on the surface of the dry food product without substantially cooking the dry food product;

(k) said control system setting preselected temperature and humidity levels within the pasteurization chamber such that when the pasteurization medium condenses on the surface of the dry food product, a heat of condensation is produced that is sufficient to kill a percentage of any pathogenic microorganisms which may be present on the surface of the dry food product without substantially cooking the dry food product; and (l) said control system operational so that if the measured temperature and/or humidity within the steam chamber and/or the pasteurization chamber deviates sufficiently from the preselected temperature and humidity levels, the control system alters the temperature and/or pressure and/or volume of the saturated steam supplied to the steam chamber and/or alters the temperature and/or moisture content of the pasteurization medium supplied to the pasteurization chamber to bring the temperature and/or humidity within the steam chamber and/or pasteurization chamber to within an acceptable deviation from the preselected temperature and/or humidity levels within the steam chamber and/or pasteurization chamber.

9. The pasteurization apparatus of claim 8, wherein the control system controls the operation of the pasteurization medium supply system to produce air at a temperature above about 212° F. at a humidity level between about 72% MV and 88% MV, and said control system controls the operation of the steam generating system to produce saturated steam at a temperature equal to or below about 212° F. at a humidity level between about 90% MV and 100% MV.

10. The pasteurization apparatus of claim 8, wherein the control system controls the operation of the pasteurization medium supply system to produce air at a temperature between about 220° F. and 450° F. at a humidity level between about 60% MV and 90% MV, and the said control system controls the operation of the steam generating system to produce saturated steam at a temperature between about 200° F. and 212° F.

11. The pasteurization apparatus of claim 8, wherein the control system controls the operation of the pasteurization medium supply system to produce air at a temperature between about 385° F. and 395° F. at a humidity level between about 75% MV and 85% MV, and said control system controls the operation of the steam generating system to produce saturated steam at a temperature between about 204° F. and 212° F.

12. The pasteurization apparatus of claim 8, wherein the isolation system comprises a number of steam knives.

13. The pasteurization apparatus of claim 12, wherein the isolation system comprises at least one steam knife which is positioned at an interface between the steam chamber and the pasteurization chamber.

14. A pasteurization method for pasteurizing a dry food product based on the heat of condensation from saturated steam and based on the heat of condensation from a pasteurization medium, and without substantially cooking the dry food product, the method comprising:

providing a steam zone which comprises saturated steam at a temperature set point equal to or below about 212° F. and at a humidity set point level of between about 90% MV and 100% MV;

providing a pasteurization zone adjacent the steam zone which comprises a pasteurization medium composed of air at a temperature set point above about 212° F. and at a humidity set point level of between about 72% MV and 88% MV;

isolating the steam zone from the pasteurization zone to retain the saturated steam in the steam zone and to retain the pasteurization medium within the pasteurization zone;

conveying the dry food product through the steam zone and then through the impingement zone at a selected speed;

measuring the temperature and humidity levels in the steam zone and in the pasteurization zone;

controlling the supply of saturated steam in the steam zone so that as the dry food product is being conveyed through the steam zone, the saturated steam condenses on the surface of the dry food product in sufficient quantity to produce a heat of condensation which is sufficient to kill a first percentage of any pathogenic microorganisms present thereon;

controlling the pasteurization medium in the pasteurization zone so that as the dry food product is being conveyed through the pasteurization zone, the moisture of the pasteurization medium condenses on the surface of the dry food product in sufficient quantity to produce a heat of condensation which is sufficient to kill a second percentage of the pathogenic microorganisms;

adjusting the temperature and/or the humidity of a steam supply to the steam zone if the measured temperature and/or humidity levels deviate by a predetermined variance from the temperature and/or humidity set points in the steam zone; and adjusting the temperature and/or the humidity levels of a pasteurization medium supply to the pasteurization zone if the measured temperature and/or humidity levels deviate by a predetermined variance from the temperature and/or humidity set points in the pasteurization zone.

15. The pasteurization apparatus of claim 13, wherein the isolation system is configured and positioned to isolate the saturated steam in the steam chamber from a location upstream of the steam chamber.

16. The pasteurization apparatus of claim 15, wherein the isolation system comprises at least one of a steam knife and a vent stack which is positioned at an interface between the steam chamber and the location upstream of the steam chamber.

17. A pasteurization apparatus for pasteurizing a dry food product based on the heat of condensation from a pasteurization medium and without substantially cooking the dry food product, the apparatus comprising:

(a) a pasteurization chamber;

(b) a conveyor extending through the pasteurization chamber for conveying the dry food product through the pasteurization chamber;

(c) a pasteurization medium generator in fluid flow communication with the pasteurization chamber, said pasteurization medium generator generating a pasteurization medium comprising heated, moist air for the pasteurization chamber;

(d) a circulation system for directing the pasteurization medium onto the dry food product in a first zone within the pasteurization chamber and in a second zone within the pasteurization chamber;

(e) a measurement system for measuring the temperature and humidity within the pasteurization chamber;

(f) a control system for setting preselected temperature and humidity levels of the pasteurization medium in the first zone in the pasteurization chamber such that the surface temperature of the dry food product is below the dew point temperature of the pasteurization medium, and such that heated, moist air of the pasteurization medium condenses on the surface of the dry food product and produces a heat of condensation which is sufficient to kill a percentage of any pathogenic microorganisms which may be present thereon without substantially cooking the dry food product; and (g) said control system setting preselected temperature and humidity levels of the pasteurization medium in the second zone in the pasteurization chamber such that the surface temperature of the dry food product is approximately the same as or greater than the dew point temperature of the pasteurization medium, and such that the pasteurization medium causes the moisture to evaporate from the surface of the dry food product; and (h) said control system if the measured temperature and/or humidity within the first and/or second zone in the pasteurization chamber deviates sufficiently from the preselected temperature and/or humidity levels, controlling the pasteurization medium generator to alter the temperature and/or moisture content of the pasteurization medium to bring the temperature and/or humidity levels within the pasteurization chamber to within an acceptable deviation from the preselected temperature and/or humidity levels within the pasteurization chamber.

18. A pasteurization method for pasteurizing a dry food product based on the heat of condensation from a pasteurization medium, and without substantially cooking the dry food product, the method comprising:

(a) generating a pasteurization medium comprising heated, moist air with a dew point temperature greater than an initial surface temperature of the dry food product;

(b) conveying the dry food product through the pasteurization medium;

(c) measuring the temperature of the dry food product prior to conveying the dry food product through the pasteurization medium;

(d) condensing a sufficient quantity of the pasteurization medium on the surface of the dry food product to thereby produce a heat of condensation which is sufficient to kill a percentage of any pathogenic microorganisms which may be present thereon without substantially cooking the dry food product;

(e) heating the dry food product with the pasteurization medium until the surface temperature of the dry food product is approximately the same as or greater than the dew point temperature of the pasteurization medium;

(f) evaporating the condensation from the surface of the dry food product using the pasteurization medium;

(g) measuring the temperature and humidity of the pasteurization medium; and (h) if the dew point temperature of the pasteurization medium is not greater than the initial surface temperature of the dry food product, adjusting the dew point temperature of the pasteurization medium to be greater than the initial temperature of the dry food product.

19. A pasteurization apparatus for pasteurizing a dry food product based on the heat of condensation from saturated steam and based on the heat of condensation from a pasteurization medium without substantially cooking the dry food product, the apparatus comprising:

(a) a steam chamber;

(b) a pasteurization chamber which is located downstream of the steam chamber;

(c) a conveyor conveying the dry food product through the steam chamber and the pasteurization chamber from a first location immediately upstream of the steam chamber to a second location immediately downstream of the pasteurization chamber;

(d) a steam supply system for generating saturated steam and supplying the saturated steam to the steam chamber at a set point temperature equal to or below about 212° F. and/or a set point humidity level between about 90% MV and 100% MV;

(e) a pasteurization medium supply system for generating heated, moist air and supplying the pasteurization medium to the pasteurization chamber at a set point temperature above about 212° F. and a humidity set point level of between about 72% MV and 88% MV;

(f) an isolation system configured and positioned to isolate the saturated steam in the steam chamber from the pasteurization medium in the pasteurization chamber;

(g) a measurement system for measuring the temperature and humidity levels within the steam chamber and within the pasteurization chamber;

(h) a control system for controlling the temperature and moisture content of the saturated steam in the steam chamber so that as the dry food product is conveyed through the steam chamber, the saturated steam condenses in sufficient quantity on the surface of the dry food product to produce a heat of condensation which is sufficient to kill a first percentage of any pathogenic microorganisms present thereon without substantially cooking the dry food product;

(i) said control system controlling the temperature and moisture content of the pasteurization medium in the pasteurization chamber such that as the dry food product is conveyed through the pasteurization chamber, the moisture in the pasteurization medium condenses in sufficient quantity on the surface of the dry food product to produce a heat of condensation which is sufficient to kill a second percentage of the pathogenic microorganisms without substantially cooking the dry food product;

(j) said control system setting preselected temperature and humidity levels within the steam chamber such that when the steam condenses on the surface of the dry food product, a heat of condensation is produced that is sufficient to kill a percentage of any pathogenic microorganisms which may be present on the surface of the dry food product without substantially cooking the dry food product;

(k) said control system setting preselected temperature and humidity levels within the pasteurization chamber such that when the pasteurization medium condenses on the surface of the dry food product, a heat of condensation is produced that is sufficient to kill a percentage of any pathogenic microorganisms which may be present on the surface of the dry food product without substantially cooking the dry food product; and (l) said control system operational so that if the measured temperature and/or humidity within the steam chamber and/or the pasteurization chamber deviates sufficiently from the preselected temperature and humidity levels, the control system controls the steam supply system to alter the temperature and/or moisture content within the steam chamber and/or controls the pasteurization medium supply system to alter the temperature and/or moisture content of the pasteurization medium to bring the temperature and/or humidity within the steam chamber and/or pasteurization chamber to within an acceptable deviation from the preselected temperature and/or humidity levels within the steam chamber and/or pasteurization chamber.

20. The pasteurization apparatus of claim 19, wherein the isolation system comprises at least one of a steam knife and a vent stack which is positioned at an interface between the steam chamber and the pasteurization chamber.

21. The pasteurization apparatus of claim 13, wherein the isolation system further comprises a vent stack which is positioned at the interface between the steam chamber and the pasteurization chamber.

22. The pasteurization method of claim 14, wherein isolating the steam zone from the pasteurization zone comprises operating a steam knife between the steam zone and the pasteurization zone.

23. The pasteurization method of claim 14, further comprising:
   determining an average surface temperature of the dry food product in at least one of the steam zone and the pasteurization zone; and
   controlling the quantity of the dry food product being conveyed through the steam zone and pasteurization zone based on the measured average surface temperature of the dry food product.

24. The pasteurization method of claim 23, wherein the temperature determining step comprises determining the temperature of a simulated dry food product which is conveyed within the dry food product through the at least one of the steam zone and the pasteurization zone, the simulated food product being configured to generally resemble the dry food product and being made of a heat conductive material.

25. The pasteurization method of claim 14, further comprising controlling the delivery of the pasteurization medium within the pasteurization zone so that, after the step of condensing the moisture in the heated, moist air onto the dry food product, the moisture from the surface of the dry food product is evaporated as the dry food product is further conveyed through the pasteurization zone.

26. The pasteurization method of claim 25, further comprising controlling the pasteurization medium within the pasteurization zone to repeat the condensing and evaporating steps in turn while the dry food product is being conveyed through the pasteurization zone to achieve a desired kill percentage of the pathogenic microorganisms.

27. The pasteurization method of claim 18, wherein:
   the evaporating step lowers the surface temperature of the dry food product to below the dew point temperature of the pasteurization medium, and
   the pasteurization method further comprises repeating the condensing, heating and evaporating steps in turn.

28. The pasteurization method of claim 18, further comprising, prior to the step of conveying the dry food product through the pasteurization medium:
   generating saturated steam;
   conveying the dry food product through the saturated steam; and
   condensing a sufficient quantity of steam on the surface of the dry food product to thereby produce a heat of condensation which is sufficient to kill a percentage of any pathogenic microorganisms which may be present thereon without substantially cooking the dry food product.

29. The pasteurizing apparatus of claim 1, wherein the control system controls the operation of the pasteurization medium supply system to produce heated, moist air at a temperature between about 220° F. and 450° F. at a humidity level between about 60% MV and 90% MV.

30. The pasteurization apparatus of claim 1, wherein the control system controls the loading level of the dry food product on the conveyor, and adjusts the loading level of the dry food product on the conveyor based on the measured average surface temperature of the dry food product.

31. The pasteurization apparatus according to claim 30, wherein the control system controls the loading level of the dry food product on the conveyor also based on the temperature and humidity levels within the pasteurization chamber.

32. The pasteurization apparatus according to claim 1, wherein if the measurement system for measuring the temperature and humidity levels within the pasteurization chamber measures a deviation of the temperature and/or humidity within the pasteurization chamber from the preselected temperature and/or humidity levels within the pasteurization chamber, the control system determines whether or not the pasteurization medium contained a heated condensation which was sufficient to kill a desired percentage of the pathogenic microorganisms which may be present on the surface of the dry food product, and based on this determination, decides the disposition of the dry food product.

33. The pasteurization apparatus according to claim 8, wherein:
   said measurement system further comprising a subsystem for determining an average surface temperature of the dry food product being carried by the conveyor, the temperature measurement subsystem comprising a simulated food product positioned on the conveyor within the dry food product which is constructed of a highly heat-conductive material and is configured to resemble the dry food product, and a temperature sensor which is attached to the simulated food product on or near the surface of the simulated food product; and
   the control system controls the loading of the dry food product on the conveyor, and adjusts the loading of the dry food product on the conveyor based on the measured average surface temperature of the dry food product.

34. The measurement system according to claim 8, further comprising:
   a circulation system for circulating the pasteurization medium through the pasteurization temperature and on to the dry food product being carried by the conveyor;
   said control system setting a preselected velocity for the pasteurization medium being circulated through the pasteurization chamber by the circulation system;
   said control system controlling the velocity of the pasteurization medium circulated through the pasteurization chamber by the circulation system and adjusting of the measured velocity of the pasteurization medium circulated through the pasteurization chamber deviates sufficiently from the preselected velocity, the control system altering the velocity of the pasteurization medium flowing through the pasteurization chamber to be within an accepted deviation of preset velocity; and
   a measurement system measuring the velocity of the pasteurization medium being circulated by the circulation system.

35. The pasteurization apparatus according to claim 34, wherein the control system based on the measurements by the measurement system determines whether the temperature and humidity of the steam within the steam chamber and the temperature and humidity within the pasteurization chamber were sufficient to kill a desired percentage of the pathogenic microorganisms present on the surface of the dry food product, and if not, the control system adjusts the velocity of the pasteurization medium circulated through the pasteurization chamber by the circulation system.

36. The pasteurization method of claim 23, wherein controlling the quantity of the dry food product being conveyed through the steam and pasteurization zones is also based on the measured temperature and humidity of the steam zone and/or the pasteurization zone.

* * * * *